(12) United States Patent
Fukushima et al.

(10) Patent No.: US 11,740,484 B2
(45) Date of Patent: Aug. 29, 2023

(54) IMAGE SHAKE CORRECTION DEVICE AND IMAGING DEVICE

(71) Applicant: FUJIFILM Corporation, Tokyo (JP)

(72) Inventors: Hajime Fukushima, Saitama (JP); Shinji Otsuka, Saitama (JP); Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 396 days.

(21) Appl. No.: 17/158,443

(22) Filed: Jan. 26, 2021

(65) Prior Publication Data

US 2021/0149210 A1  May 20, 2021

Related U.S. Application Data

(63) Continuation of application No. PCT/JP2019/021626, filed on May 30, 2019.

(30) Foreign Application Priority Data

Jul. 27, 2018 (JP) .................... 2018-141584

(51) Int. Cl.
*H04N 23/68* (2023.01)
*G02B 27/64* (2006.01)
*G03B 5/02* (2021.01)

(52) U.S. Cl.
CPC ............. *G02B 27/646* (2013.01); *G03B 5/02* (2013.01); *H04N 23/68* (2023.01);
(Continued)

(58) Field of Classification Search
None
See application file for complete search history.

(56) References Cited

U.S. PATENT DOCUMENTS 5,721,969 A      2/1998  Arai
10,863,093 B2 *  12/2020 Fukushima .......... H04N 23/687
(Continued)

FOREIGN PATENT DOCUMENTS

CN      101324737 A    12/2008
CN      101681081 A     3/2010
(Continued)

OTHER PUBLICATIONS

International Search Report issued in PCT/JP2019/021626; dated Aug. 13, 2019.
(Continued)

*Primary Examiner* — Derek S. Chapel
(74) *Attorney, Agent, or Firm* — Studebaker & Brackett PC

(57) ABSTRACT

An image shake correction device includes a movement restrictor that restricts movement of a movable member in directions X, Y, θ, and Z. The movement restrictor includes a movement prevention member that is fixed to a base of a support member and prevents the movable member from moving in the direction Z while sandwiching the movable member in cooperation with the support member, a hole portion formed in the support member, and an insertion member that is formed in the movable member and is inserted into the hole portion. A wide width portion of the insertion member has a size that overlaps with the base of the support member even in a state in which an abutting portion of the insertion member is positioned in any position in the hole portion.

16 Claims, 15 Drawing Sheets

(52) U.S. Cl.
CPC ... *H04N 23/687* (2023.01); *G03B 2205/0038* (2013.01); *G03B 2205/0069* (2013.01)

(56) References Cited

U.S. PATENT DOCUMENTS

| | | | | |
|---|---|---|---|---|
| 10,884,259 | B2* | 1/2021 | Awazu | ............ H04N 23/54 |
| 11,402,653 | B2* | 8/2022 | Awazu | ............ G03B 5/00 |
| 2006/0164516 | A1 | 7/2006 | Kurosawa | |
| 2007/0093108 | A1 | 4/2007 | Nemoto et al. | |
| 2008/0225126 | A1* | 9/2008 | Mogamiya | ............ H04N 23/68 |
| | | | | 348/208.4 |
| 2010/0195206 | A1 | 8/2010 | Miyamori et al. | |
| 2011/0181740 | A1 | 7/2011 | Watanabe et al. | |
| 2011/0317266 | A1 | 12/2011 | Miyamori et al. | |
| 2014/0293073 | A1 | 10/2014 | Okamura et al. | |
| 2015/0070115 | A1 | 3/2015 | Okamura et al. | |
| 2016/0041403 | A1 | 2/2016 | Yoshida et al. | |
| 2016/0042853 | A1 | 2/2016 | Yoshida et al. | |
| 2017/0244898 | A1 | 8/2017 | Shintani | |
| 2017/0353663 | A1 | 12/2017 | Asakawa | |
| 2020/0228711 | A1* | 7/2020 | Awazu | ............ H04N 23/6812 |
| 2022/0334404 | A1* | 10/2022 | Awazu | ............ G02B 27/646 |
| 2023/0102719 | A1* | 3/2023 | Abe | ............ H04N 23/685 |
| | | | | 396/55 |

FOREIGN PATENT DOCUMENTS

| | | |
|---|---|---|
| CN | 102135699 A | 7/2011 |
| CN | 102165368 A | 8/2011 |
| CN | 103842901 A | 6/2014 |
| CN | 107463050 A | 12/2017 |
| JP | 2000-330154 A | 11/2000 |
| JP | 2006-203624 A | 8/2006 |
| JP | 2007-102034 A | 4/2007 |
| JP | 2008-191550 A | 8/2008 |
| JP | 2010-096826 A | 4/2010 |
| JP | 2013-003404 A | 1/2013 |
| JP | 2015-055795 A | 3/2015 |
| WO | 2017145205 A1 | 8/2017 |

OTHER PUBLICATIONS

International Preliminary Report On Patentability and Written Opinion issued in PCT/JP2019/021626; dated Feb. 2, 2021.

An Office Action mailed by China National Intellectual Property Administration dated Aug. 26, 2021, which corresponds to Chinese Patent Application No. 201980049987.7 and is related to U.S. Appl. No. 17/158,443; with English language translation.

* cited by examiner

IMAGE SHAKE CORRECTION DEVICE AND IMAGING DEVICE

CROSS REFERENCE TO RELATED APPLICATION

This is a continuation of International Application No. PCT/JP2019/021626 filed on May 30, 2019, and claims priority from Japanese Patent Application No. 2018-141584 filed on Jul. 27, 2018, the entire disclosures of which are incorporated herein by reference.

BACKGROUND OF THE INVENTION

1. Field of the Invention

The present invention relates to an image shake correction device and an imaging device.

2. Description of the Related Art

An imaging device comprising an imaging element that images a subject through an imaging optical system or a lens device used by being attached to the imaging device has an image shake correction function of correcting shake (hereinafter, referred to as image shake) of a captured image caused by vibration of the device.

For example, in the lens device, image shake correction is performed by moving a correction lens included in an imaging optical system in a surface perpendicular to an optical axis such that the vibration of the device is detected based on information from a motion detection sensor such as an acceleration sensor or angular velocity sensor mounted on the lens device and the detected vibration is canceled.

In the imaging device, the image shake correction is performed by moving one or both of the correction lens included in the imaging optical system and the imaging element on a surface perpendicular to an optical axis such that the vibration of the device is detected based on information from a motion detection sensor such as an acceleration sensor or an angular velocity sensor mounted on the imaging device and the detected vibration is canceled.

JP2010-096826A, JP2013-003404A, and JP2006-203624A describe an image shake correction device that performs image shake correction by moving an imaging element.

SUMMARY OF THE INVENTION

In the image shake correction device, a pressing member for pressing a movable member to a fixed member side is attached to a fixed member that supports the movable member from a rear surface side from a front surface side of the movable member in order to prevent the movable member from being lifted in a direction perpendicular to a movement plane of the movable member (see JP2010-096826A).

In order to achieve weight reduction of the image shake correction device, it is effective to reduce an installation area of the pressing member. However, in a case where the installation area of the pressing member is excessively reduced, it is not possible to prevent the movable member from being lifted. Thus, it is difficult to achieve both the size reduction and weight reduction by reducing the number of pressing members and prevention of the movable member from being lifted.

JP2010-096826A does not consider reducing the number of pressing members.

The image shake correction device described in JP2013-003404A does not have the pressing member, and fixes a movable portion to a fixed portion with a screw. Thus, there is no problem that the number of pressing members is reduced.

The image shake correction device described in JP2006-203624A prevents a movable member from being lifted by hooking a large-diameter portion of an engagement pin formed on the movable member to a periphery of an engagement window provided on a fixed member without including the pressing member. However, in this image shake correction device, friction between the engagement pin and an inner surface of the engagement window constantly occurs with the movement of the movable member. Thus, the responsiveness of the driving is reduced, and a power required for the driving is increased.

The present invention has been made in view of the aforementioned circumstances, and an object of the present invention is to provide an image shake correction device capable of preventing a movable member from being lifted while realizing weight reduction, size reduction, and improvement in responsiveness, and an imaging device including the same.

An image shake correction device according to an embodiment of the present invention comprises a movable member to which an imaging element is fixed, a support member that supports the movable member to be movable in a plurality of directions including a first direction and a second direction orthogonal to each other along a light receiving surface of the imaging element, and is disposed opposite light receiving surface with respect to the movable member, and a movement restrictor that restricts movement of the movable member in the plurality of directions and a direction perpendicular to the light receiving surface. The movement restrictor includes a movement prevention member that is fixed to the support member and prevents the movable member from moving in the direction perpendicular to the light receiving surface while sandwiching the movable member in cooperation with the support member, a hole portion that is formed in one member of the movable member and the support member, and an insertion member that is formed at other member of the movable member and the support member and is inserted into the hole portion. The movement prevention member has of a first portion that is adjacent to a first side of the light receiving surface and extends along the first side, and a second portion that is adjacent to a second side orthogonal to the first side of the light receiving surface and extends along the second side. The hole portion is formed in a region opposite the first portion with respect to a straight line passing through a center of the light receiving surface and extending in a direction parallel to the first side and opposite the second portion with respect to a straight line passing through the center of the light receiving surface and extending in a direction parallel to the second side as viewed from the direction perpendicular to the light receiving surface. The insertion member includes an abutting portion that is positioned in the hole portion and enters a state in which the abutting portion abuts on an inner surface of the hole portion and a state in which the abutting portion does not abut on the inner surface by moving in the plurality of directions in the hole portion in accordance with the movement of the movable member, and a wide width portion that is disposed outside the hole portion opposite a side of the other member on which the insertion member is formed. The wide width portion has a size such that the wide width portion overlaps the one member on which the hole portion is formed as viewed from the direction perpendicular to the light receiving surface even in a state in which the abutting portion is positioned at any position in the hole portion.

An imaging device according to the embodiment of the present invention comprises the image shake correction device.

According to the present invention, it is possible to provide an image shake correction device capable of preventing a movable member from being lifted while realizing weight reduction and size reduction, and an imaging device including the same.

DESCRIPTION OF THE PREFERRED EMBODIMENTS

Hereinafter, embodiments of the present invention will be described with reference to the drawings.

Figure 1:
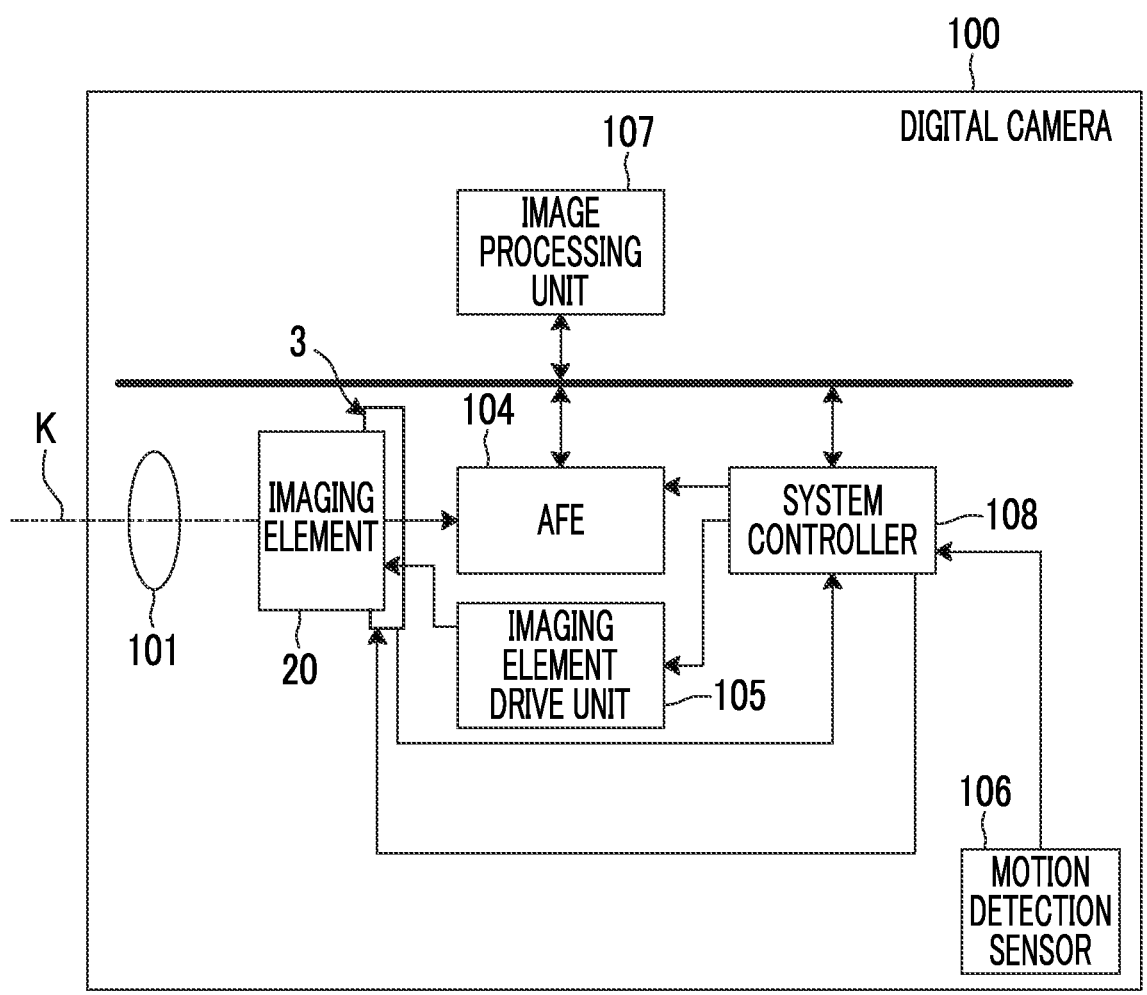
FIG. 1 is a diagram showing a schematic configuration of a digital camera 100 which is an embodiment of an imaging device according to an embodiment of the present invention.

FIG. 1 is a diagram showing a schematic configuration of a digital camera 100 which is an embodiment of an imaging device according to the embodiment of the present invention.

The digital camera 100 comprises an imaging optical system 101, an imaging element 20, an image shake correction device 3, an imaging element drive unit 105 that drives the imaging element 20, an analog front end (AFE) 104, an image processing unit 107, a motion detection sensor 106, and a system controller 108 that performs overall control of the entire digital camera 100.

The imaging optical system 101 includes an imaging lens such as a focus lens or a zoom lens, and a stop.

The imaging element 20 images a subject through the imaging optical system 101, and comprises a semiconductor chip on which a charge coupled device (CCD) image sensor or a complementary metal oxide semiconductor (CMOS) image sensor is formed and a package that accommodates the semiconductor chip.

Figure 3:
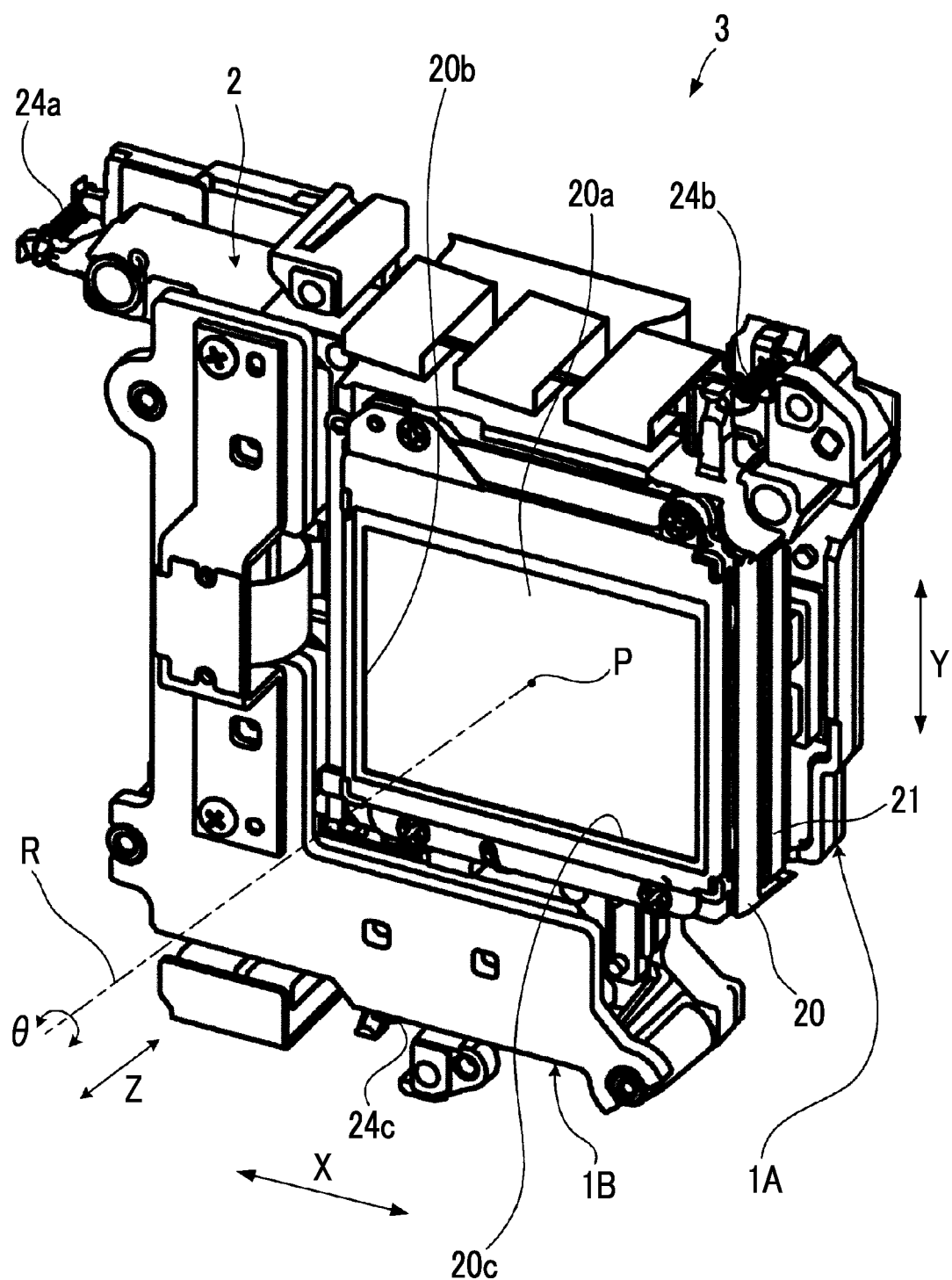
FIG. 3 is a perspective view showing an appearance configuration of the image shake correction device 3 shown in FIGS. 1 and 2.

As shown in FIG. 3 to be described below, a light receiving surface 20a of the imaging element 20 has a rectangular shape.

The image shake correction device 3 corrects image shake of a captured image captured by the imaging element 20 by moving the light receiving surface 20a of the imaging element 20 within a surface perpendicular to an optical axis K of the imaging optical system 101.

In the present specification, in the digital camera 100, a state in which the light receiving surface 20a of the imaging element 20 is perpendicular to a gravity direction (a state in which the optical axis K is parallel to the gravity direction), and a state in which a center of the light receiving surface 20a is positioned on the optical axis K are referred to as a reference state.

Although the detailed configuration of the image shake correction device 3 will be described below, the image shake is corrected by moving the imaging element 20 in three directions of a second direction which is a longitudinal direction (direction X shown in FIG. 3) of the light receiving surface 20a of the imaging element 20 in the reference state, a first direction which is a lateral direction (direction Y shown in FIG. 3) of the light receiving surface 20a of the imaging element 20 in the reference state, and a third direction which is a rotation direction (direction θ shown in FIG. 3) using the center P of the light receiving surface 20a of the imaging element 20 in this reference state as a center.

The AFE 104 includes a signal processing circuit that performs correlative double sampling processing and digital conversion processing on imaging signals output from the imaging element 20.

The image processing unit 107 performs digital signal processing on the imaging signals processed by the AFE 104, and generates captured image data such as a Joint Photographic Experts Group (JPEG) format.

The motion detection sensor 106 is a sensor that detects the movement of the digital camera 100, and includes an acceleration sensor, an angular velocity sensor, or both thereof.

The system controller 108 controls the imaging element drive unit 105 and the AFE 104 such that the subject is captured by the imaging element 20 and the imaging signal corresponding to a subject image is output from the imaging element 20.

The system controller 108 controls the image shake correction device 3 based on movement information of the digital camera 100 detected by the motion detection sensor 106.

The system controller 108 corrects the image shake of the captured image captured by the imaging element 20 by moving the light receiving surface 20a of the imaging element 20 in at least one of the direction X, the direction Y, or the direction θ.

In a state in which the image shake correction device 3 is energized, in a case where the movement of the digital camera 100 is not detected by the motion detection sensor 106, the system controller 108 controls the image shake correction device 3 such that a position of the light receiving surface 20a of the imaging element 20 is a position in the reference state.

Figure 2:
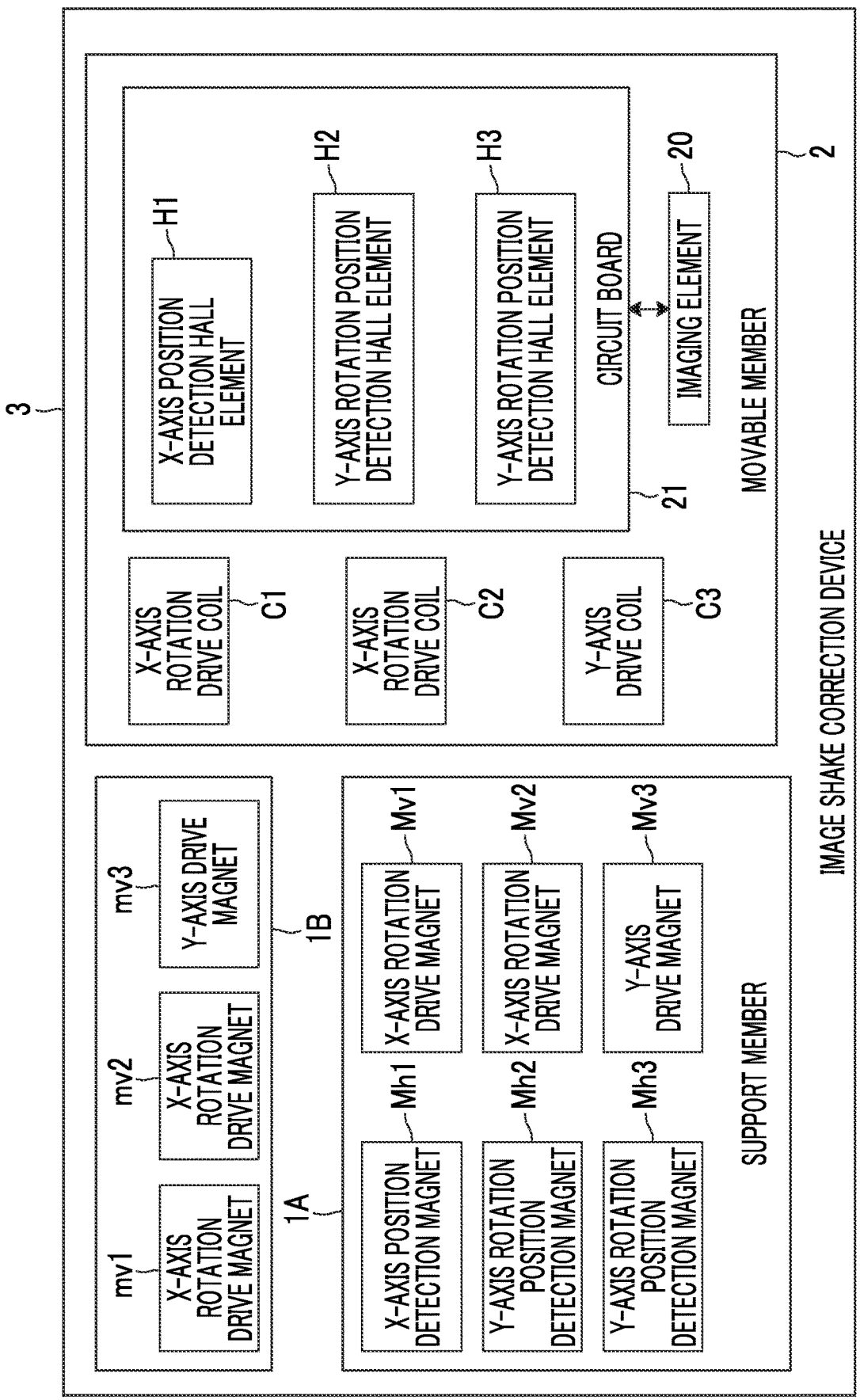
FIG. 2 is a diagram showing a schematic configuration of an image shake correction device 3 in the digital camera 100 shown in FIG. 1.

FIG. 2 is a diagram showing a schematic configuration of the image shake correction device 3 in the digital camera 100 shown in FIG. 1.

The image shake correction device 3 comprises a movable member 2 movable in each of the directions X, Y, and θ, a support member 1A that supports the movable member 2 to be movable in each of the directions X, Y, and θ, and a movement prevention member 1B that prevents the movement of the movable member 2 in a direction of the optical axis K while sandwiching the movable member 2 in cooperation with the support member 1A.

A circuit board 21 on which the imaging element 20 is fixed (mounted), an X-axis rotation drive coil C1, an X-axis rotation drive coil C2, and a Y-axis drive coil C3 are fixed to the movable member 2. The X-axis rotation drive coil C1, the X-axis rotation drive coil C2, and the Y-axis drive coil C3 form a drive coil.

An X-axis position detection Hall element H1 that is a position detection element for detecting a position of the movable member 2 in the direction X, and a Y-axis rotation position detection Hall element H2 and a Y-axis rotation position detection Hall element H3 which are position detection elements for detecting positions of the movable member 2 in the direction Y and the direction θ are fixed to the circuit board 21.

Hereinafter, the X-axis position detection Hall element H1, the Y-axis rotation position detection Hall element H2, and the Y-axis rotation position detection Hall element H3 are collectively and simply referred to as position detection elements.

Output signals of the X-axis position detection Hall element H1, the Y-axis rotation position detection Hall element H2, and the Y-axis rotation position detection Hall element H3 are input to the system controller 108.

The system controller 108 moves the movable member 2 by controlling a control current flowing through the X-axis rotation drive coil C1, a control current flowing through the X-axis rotation drive coil C2, and a control current flowing through the Y-axis drive coil C3 based on the output signals, and corrects the image shake.

An X-axis rotation drive magnet Mv1, an X-axis rotation drive magnet Mv2, a Y-axis drive magnet Mv3, an X-axis position detection magnet Mh1, a Y-axis rotation position detection magnet Mh2, and a Y-axis rotation position detection magnet Mh3 are fixed to the support member 1A. The X-axis rotation drive magnet Mv1, the X-axis rotation drive magnet Mv2, and the Y-axis drive magnet Mv3 form a first drive magnet.

Hereinafter, the X-axis position detection magnet Mh1, the Y-axis rotation position detection magnet Mh2, and the Y-axis rotation position detection magnet Mh3 are collectively and simply referred to as the position detection magnets.

The X-axis rotation drive magnet mv1, the X-axis rotation drive magnet mv2, and the Y-axis drive magnet mv3 are fixed to the movement prevention member 1B. The X-axis rotation drive magnet mv1, the X-axis rotation drive magnet mv2, and the Y-axis drive magnet mv3 form a second drive magnet.

FIG. 3 is a perspective view showing an appearance configuration of the image shake correction device 3 shown in FIGS. 1 and 2. FIG. 3 shows an appearance of the image shake correction device 3 in the reference state.

As shown in FIG. 3, the image shake correction device 3 comprises the support member 1A and the movement prevention member 1B, and the movable member 2 to which the circuit board 21 on which the imaging element 20 is mounted is fixed.

The support member 1A is disposed on a rear surface side of the movable member 2 (on a surface side opposite to the light receiving surface 20a side).

The movement prevention member 1B is disposed on a front surface side (the light receiving surface 20a side) of the movable member 2, and is fixed to the support member 1A by screwing in a state in which sandwiching the movable member 2 in cooperation with the support member 1A.

The movable member 2 is sandwiched between the support member 1A and the movement prevention member 1B, and is biased against the support member 1A by springs 24a, 24b, and 24c which are elastic members.

The springs 24a, 24b, and 24c may be any springs that can bias the movable member 2 to the support member 1A by an elastic force, and may be replaced with rubber which is an elastic member, for example.

This image shake correction device 3 is fixed to main body of the digital camera 100 in a state in which the light receiving surface 20a faces the imaging optical system 101 shown in FIG. 1.

The image shake correction device 3 corrects the image shake by moving the movable member 2 in the direction θ around a rotation axis R (an axis which is parallel to the gravity direction and passes through the center P in the reference state) which is perpendicular to the light receiving surface 20a and passes through the center P of the light receiving surface 20a, the direction X which is the longitudinal direction of the light receiving surface 20a, and the direction Y which is the lateral direction of the light receiving surface 20a.

Hereinafter, a direction in which the rotation axis R extends is referred to as a direction Z. A flat surface perpendicular to the rotation axis R is a flat surface on which the movable member 2 moves.

The movable member 2 is movable in one direction (left direction) of the direction X and the other direction (right direction) of the direction X from the reference state by the same distance.

The movable member 2 is movable in one direction (up direction) of the direction Y and the other direction (down direction) of the direction Y from the reference state by the same distance.

The movable member 2 is rotatable in one direction (right rotation direction) of the direction θ and the other direction (left rotation direction) of the direction θ by the same angle.

In the digital camera 100 shown in FIG. 1, a posture in which the direction Y shown in FIG. 3 is parallel to the gravity direction is a normal posture (a posture for performing so-called horizontal photography).

Figure 4:
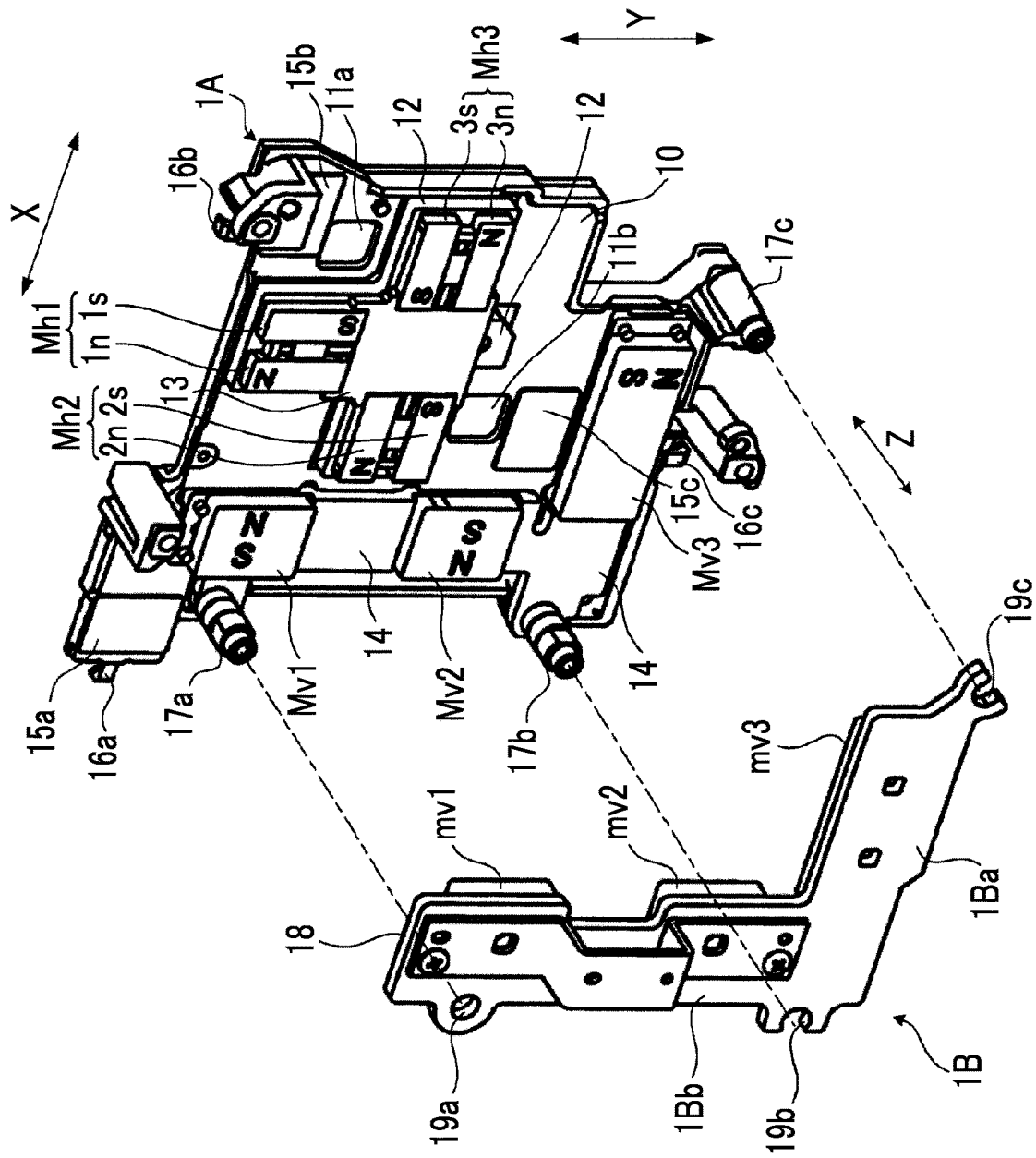
FIG. 4 is an exploded perspective view of a support member 1A and a movement prevention member 1B in the image shake correction device 3 shown in FIG. 3 as viewed from an imaging optical system 101 side.

FIG. 4 is an exploded perspective view of the support member 1A and the movement prevention member 1B in the image shake correction device 3 shown in FIG. 3 as viewed from the imaging optical system 101 side.

Figure 5:
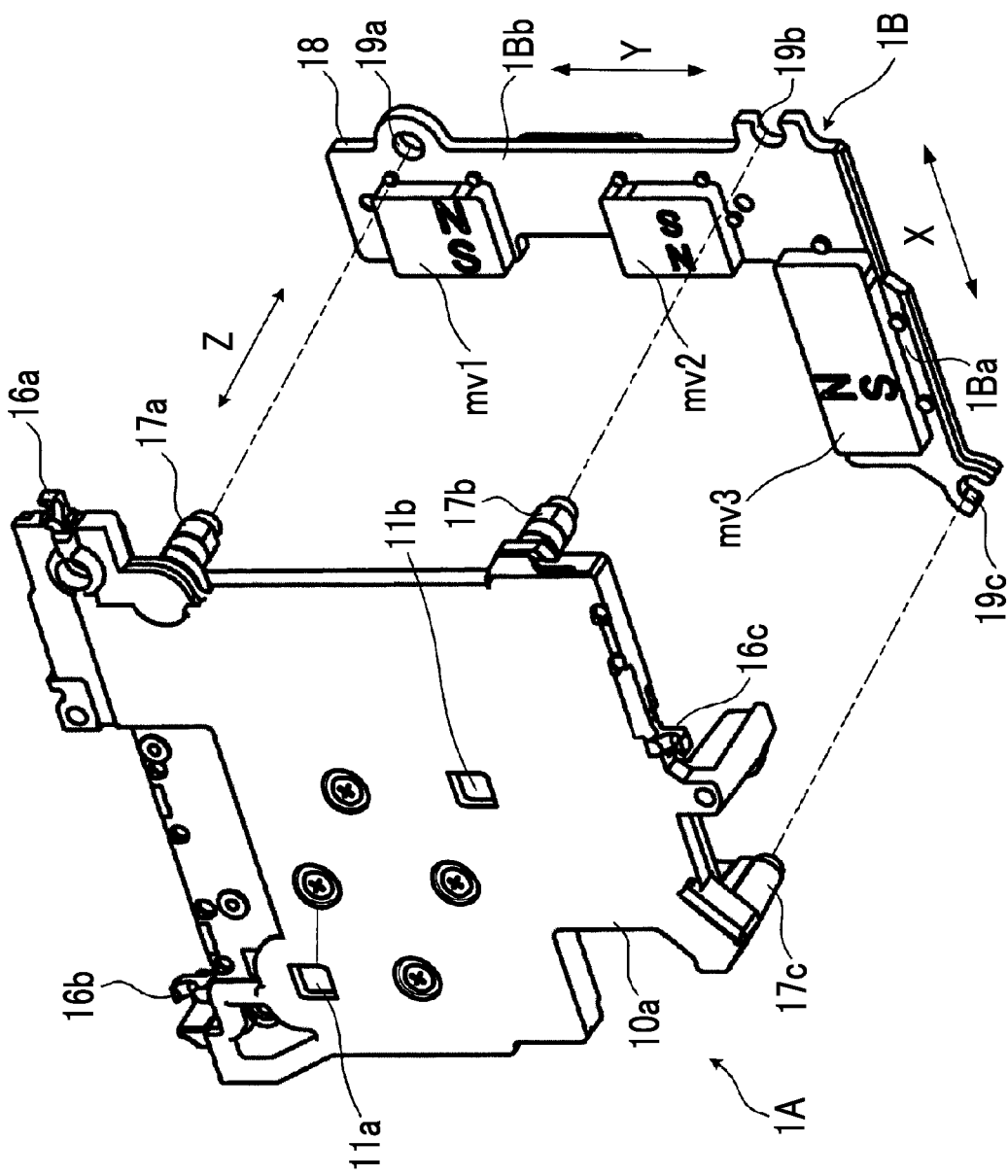
FIG. 5 is an exploded perspective view of the support member 1A and the movement prevention member 1B shown in FIG. 4 as viewed from a side opposite to the imaging optical system 101 side.

FIG. 5 is an exploded perspective view of the support member 1A and the movement prevention member 1B shown in FIG. 4 as viewed from a side opposite to the imaging optical system 101 side.

As shown in FIGS. 4 and 5, the support member 1A comprises a plate-like base 10 that is made of resin and has a flat surface perpendicular to the direction Z, and projecting portions 17a, 17b, and 17c extending in the direction Z from an edge part of the base 10 to the imaging optical system 101 side.

The movement prevention member 1B has a substantially L-shaped yoke 18 as viewed from the imaging optical system 101 side. The yoke 18 includes a first portion 1Ba that is adjacent to a first side 20c (see FIG. 3) which is one of two sides extending in the direction X of the light receiving surface 20a and extends along the first side 20c, and a second portion 1Bb that is adjacent to a second side 20b (see FIG. 3) extending in the direction Y orthogonal to the first side 20c of the light receiving surface 20a and extends along the second side 20b.

The yoke 18 is made of a material capable of preventing a magnetic flux leakage from the X-axis rotation drive magnet Mv1, the X-axis rotation drive magnet Mv2, and the Y-axis drive magnet Mv3 which form the first drive magnet and the X-axis rotation drive magnet mv1, the X-axis rotation drive magnet mv2, and the Y-axis drive magnet mv3 which form the second drive magnet, specifically, pure iron containing few impurities, steel (low carbon steel) containing low carbon, or the like.

A hole portion 19a and notch portions 19b and 19c at positions facing the projecting portions 17a, 17b and 17c are formed at the yoke 18.

In a state in which the movable member 2 is disposed between the support member 1A and the movement prevention member 1B, the projecting portion 17a of the support member 1A is fitted into the hole portion 19a of the movement prevention member 1B and is fixed by a screw.

In this state, the projecting portion 17b of the support member 1A is fitted and fixed in the notch portion 19b of the movement prevention member 1B, and the projecting portion 17c of the support member 1A is fitted and fixed in the notch portion 19c of the movement prevention member 1B.

As shown in FIG. 3, the movable member 2 is biased to the support member 1A by the springs 24a, 24b, and 24c. However, for example, in FIG. 3, in a state in which the light receiving surface 20a is directed to the ground, a force to move to the ground due to gravity acts on the movable member 2. The movement prevention member 1B sandwiches the movable member 2 in cooperation with the support member 1A, and accordingly, functions to prevent the movable member 2 from moving in the direction Z to such an extent that a rolling element, to be described below, disposed between the movable member 2 and the support member 1A falls in the direction Z.

As shown in FIG. 4, substantially L-shaped yokes 14 as viewed from the imaging optical system 101 side are formed at a left end portion in the direction X and a lower end portion in the direction Y as viewed from the imaging optical system 101 side on a surface of the base 10 on the imaging optical system 101 side.

The X-axis rotation drive magnet Mv1 and the X-axis rotation drive magnet Mv2 are arranged and fixed on a front surface of portions of the yokes 14 of the support member 1A that extends along the direction Y with a space in the direction Y.

As viewed from the imaging optical system 101 side, the X-axis rotation drive magnet Mv1 is disposed such that an N-pole faces the right direction of the direction X and an S-pole faces the left direction of the direction X.

As viewed from the imaging optical system 101 side, the X-axis rotation drive magnet Mv2 is disposed such that an N-pole faces the left direction of the direction X and an S-pole faces the right direction of the direction X.

The Y-axis drive magnet Mv3 is fixed on a front surface of a portion of the yoke 14 of the support member 1A that extends along the direction X.

As viewed from the imaging optical system 101 side, the Y-axis drive magnet Mv3 is disposed such that an N-pole faces the down direction of the direction Y and an S-pole faces the up direction of the direction Y.

Figure 6:
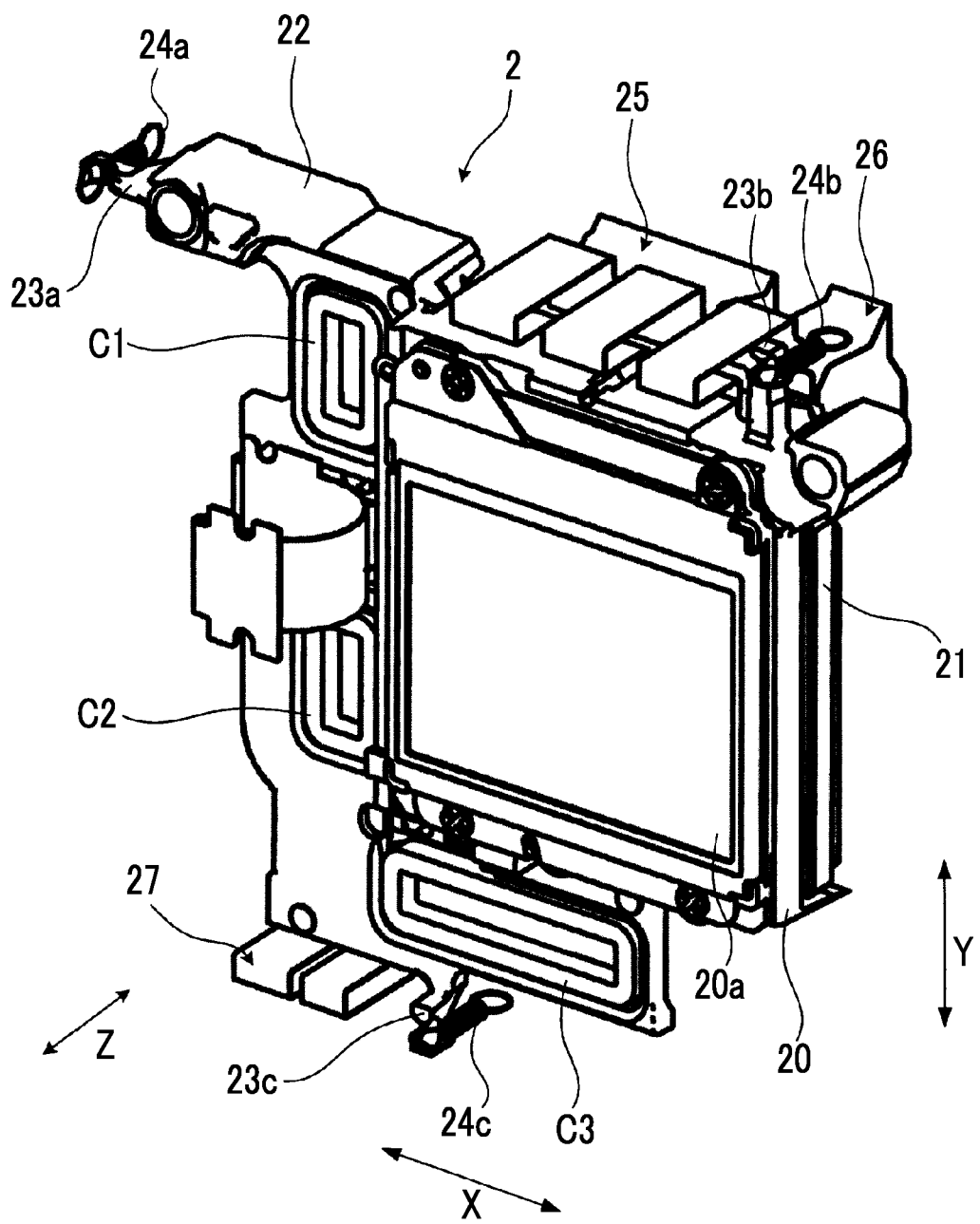
FIG. 6 is a perspective view of a movable member 2 in the image shake correction device 3 shown in FIG. 3 as viewed from the imaging optical system 101 side.
Figure 7:
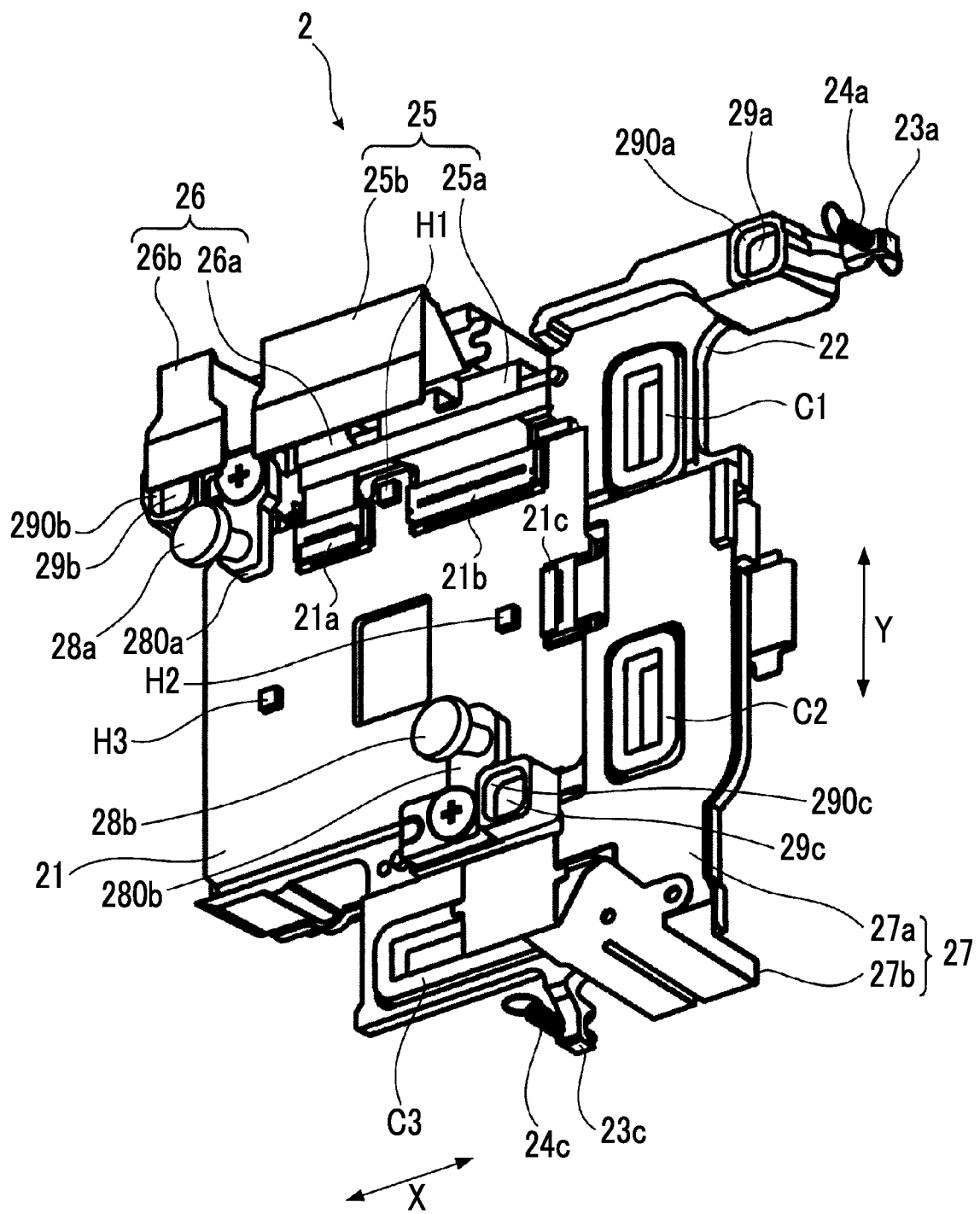
FIG. 7 is a perspective view of the movable member 2 shown in FIG. 6 as viewed from the side opposite to the imaging optical system 101 side.
Figure 8:
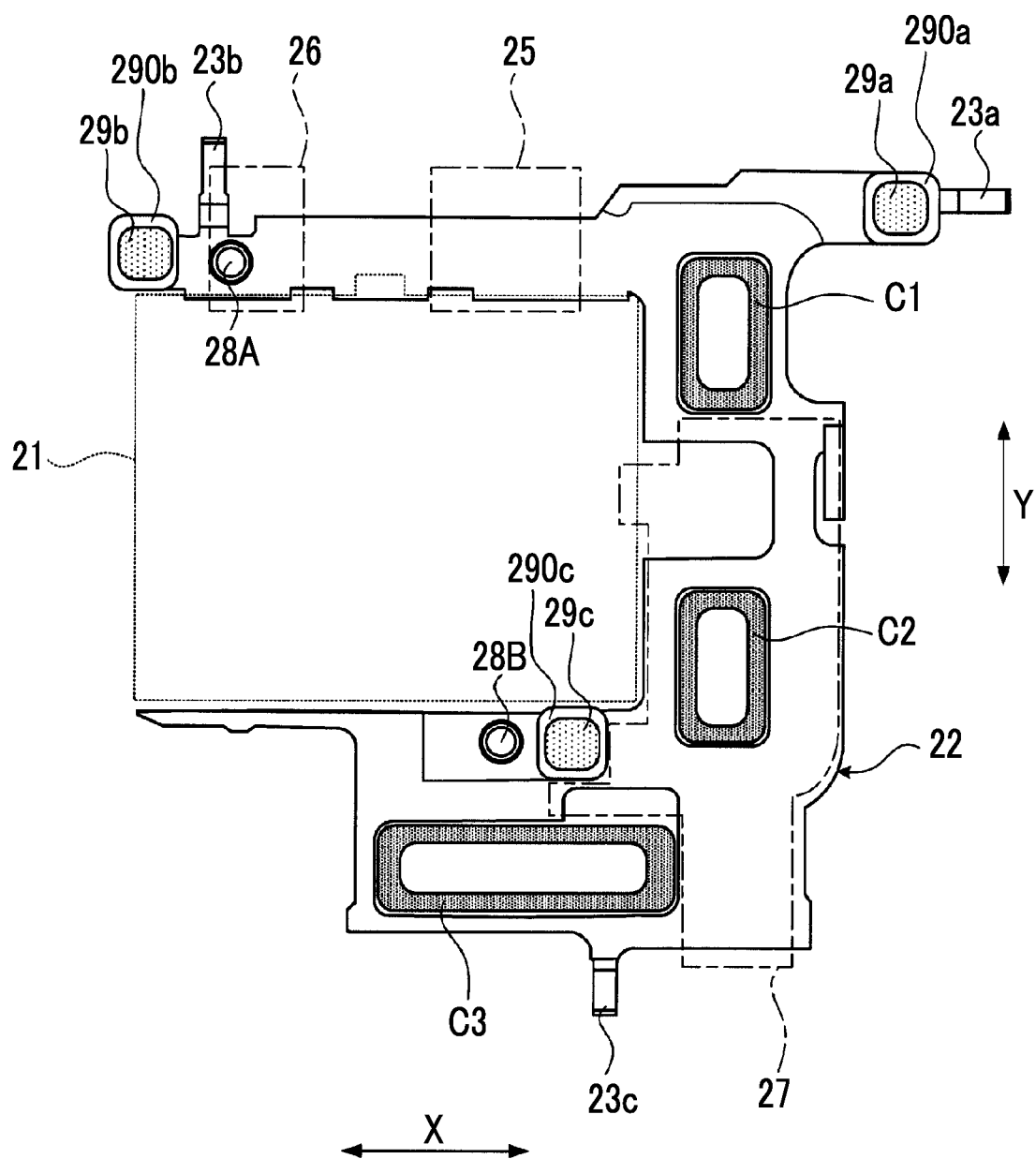
FIG. 8 is a plan view of the movable member 2 shown in FIG. 6 as viewed from the side opposite to the imaging optical system 101 side.

As shown in FIG. 5, the X-axis rotation drive magnet mv1 is fixed on a front surface of the yoke 18 of the movement prevention member 1B on the support member 1A side at a position facing the X-axis rotation drive magnet Mv1 of the support member 1A with the X-axis rotation drive coil C1 of the movable member 2 to be described in FIGS. 6 to 8 interposed therebetween.

An S-pole of the X-axis rotation drive magnet mv1 faces the N-pole of the X-axis rotation drive magnet Mv1 with the X-axis rotation drive coil C1 interposed therebetween. An N-pole of the X-axis rotation drive magnet mv1 faces the S-pole of the X-axis rotation drive magnet Mv1 with the X-axis rotation drive coil C1 interposed therebetween.

As shown in FIG. 5, the X-axis rotation drive magnet mv2 is fixed on a front surface of the yoke 18 of the movement prevention member 1B on the support member 1A side at a position facing the X-axis rotation drive magnet Mv2 of the support member 1A with the X-axis rotation drive coil C2 of the movable member 2 to be described in FIGS. 6 to 8 interposed therebetween.

An S-pole of the X-axis rotation drive magnet mv2 faces the N-pole of the X-axis rotation drive magnet Mv2 with the X-axis rotation drive coil C2 interposed therebetween. An N-pole of the X-axis rotation drive magnet mv2 faces the S-pole of the X-axis rotation drive magnet Mv2 with the X-axis rotation drive coil C2 interposed therebetween.

As shown in FIG. 5, the Y-axis drive magnet mv3 is fixed on a front surface of the yoke 18 of the movement prevention member 1B on the support member 1A side at a position facing the Y-axis drive magnet Mv3 with the Y-axis drive coil C3 of the movable member 2 to be described in FIGS. 6 to 8 interposed therebetween.

An S-pole of the Y-axis drive magnet mv3 faces the N-pole of the Y-axis drive magnet Mv3 with the Y-axis drive coil C3 interposed therebetween. An N-pole of the Y-axis drive magnet mv3 faces the S-pole of the Y-axis drive magnet Mv3 with the Y-axis drive coil C3 interposed therebetween.

As shown in FIG. 4, substantially plus-shaped yokes 12 as viewed in the direction Z are fixed to a portion facing the circuit board 21 fixed to the movable member 2 described in FIGS. 6 to 8 on a surface of the imaging optical system 101 side of the base 10 of the support member 1A.

The X-axis position detection magnet Mh1 constituting a first position detection magnet is fixed on a front surface of the yoke 12 at a position facing the X-axis position detection Hall element H1 (see FIG. 7 to be described below) fixed to the circuit board 21 fixed to the movable member 2.

The X-axis position detection magnet Mh1 has an S-pole 1s and an N-pole in which are arranged with a space in the direction X, and the X-axis position detection Hall element H1 is disposed to face an intermediate position between the S-pole is and the N-pole 1n.

The N-pole in of the X-axis position detection magnet Mh1 is disposed on the left side in the direction X as viewed from the imaging optical system 101 side with respect to the S-pole is of the X-axis position detection magnet Mh1.

The Y-axis rotation position detection magnet Mh2 constituting a second position detection magnet is fixed on the front surface of the yoke 12 at a position facing the Y-axis rotation position detection Hall element H2 (see FIG. 7 to be described below) fixed to the circuit board 21 fixed to the movable member 2.

The Y-axis rotation position detection magnet Mh2 has an S-pole 2s and an N-pole 2n arranged with a space in the direction Y, and the Y-axis rotation position detection Hall element H2 is disposed to face an intermediate position between the S-pole 2s and the N-pole 2n.

The N-pole 2n of the Y-axis rotation position detection magnet Mh2 is disposed on the upper side of the direction Y as viewed from the imaging optical system 101 side with respect to the S-pole 2s of the Y-axis rotation position detection magnet Mh2.

The Y-axis rotation position detection magnet Mh3 constituting a third position detection magnet is fixed on the front surface of the yoke 12 at a position facing the Y-axis rotation position detection Hall element H3 (see FIG. 7 to be described below) fixed to the circuit board 21 fixed to the movable member 2.

The Y-axis rotation position detection magnet Mh3 has an S-pole 3s and an N-pole 3n arranged with a space in the direction Y, and the Y-axis rotation position detection Hall element H3 is disposed to face an intermediate position between the S-pole 3s and the N-pole 3n.

The N-pole 3n of the Y-axis rotation position detection magnet Mh3 is disposed on the lower side of the direction Y as viewed from the imaging optical system 101 side with respect to the S-pole 3s of the Y-axis rotation position detection magnet Mh3.

In the example shown in FIG. 4, the X-axis position detection magnet Mh1, the Y-axis rotation position detection magnet Mh2, and the Y-axis rotation position detection magnet Mh3 are coupled and integrated by a coupling member 13. Since the coupling member 13 is fixed to the yoke 12, the X-axis position detection magnet Mh1, the Y-axis rotation position detection magnet Mh2, and the Y-axis rotation position detection magnet Mh3 are fixed to the support member 1A.

As shown in FIG. 5, the yoke 12 is fixed to the base 10 by screws inserted from screw holes formed on a rear surface 10a opposite to the imaging optical system 101 side of the base 10 of the support member 1A.

As shown in FIG. 4, three flat surfaces 15a, 15b, and 15c perpendicular to the direction Z are formed on the surface of the imaging optical system 101 side of the base 10. The positions of the flat surfaces 15a, 15b, and 15c in the direction Z are all the same, and these flat surfaces are all formed on the same flat surface.

On the surface on the imaging optical system 101 side of the base 10, a hole portion 11a for restricting the movement of the movable member 2 is formed on an upper side in the direction Y from the Y-axis rotation position detection magnet Mh3, and a hole portion 11b for restricting the movement of the movable member 2 is formed on a lower side in the direction Y from the Y-axis rotation position detection magnet Mh2, as viewed from the imaging optical system 101 side.

As shown in FIG. 5, a hook 16a extending in the direction X in which one end of the spring 24a shown in FIG. 3 is locked, a hook 16b extending in the up direction of the direction Y in which one end of the spring 24b shown in FIG. 3 is locked, and a hook 16c extending in the down direction of the direction Y in which one end of the spring 24c shown in FIG. 3 is locked are formed at a peripheral portion of the base 10.

FIG. 6 is a perspective view of the movable member 2 in the image shake correction device 3 shown in FIG. 3 as viewed from the imaging optical system 101 side.

FIG. 7 is a perspective view of the movable member 2 shown in FIG. 6 as viewed from the side opposite to the imaging optical system 101 side.

FIG. 8 is a plan view of the movable member 2 shown in FIG. 6 as viewed from the side opposite to the imaging optical system 101 side. In FIG. 8, in order to facilitate understanding of the configuration of the movable member 2, the circuit board 21 fixed to the movable member 2 is indicated by a broken line, and flexible print substrates 25, 26, and 27 connected to the circuit board 21 are indicated by imaginary lines.

As shown in FIG. 8, the movable member 2 comprises a substantially C-shaped base 22 constituted a straight-line-shaped portion extending in the direction X, a straight-line-shaped portion extending in the direction Y from a right end portion of this portion in the direction X, and a straight-line-shaped portion extending to the left side in the direction X from a lower end portion of a portion extending in the direction Y as viewed from the imaging optical system 101 side.

As shown in FIGS. 6 and 7, the circuit board 21 on which the imaging element 20 is mounted is fixed to the base 22 with an adhesive at a portion facing a region surrounded by the three portions.

As shown in FIGS. 6 to 8, the X-axis rotation drive coil C1 is formed at the base 22 at a position facing each of the X-axis rotation drive magnets Mv1 and mv1 shown in FIG. 4.

The X-axis rotation drive coil C2 is formed at the base 22 at a position facing each of the X-axis rotation drive magnets Mv2 and mv2 shown in FIG. 4.

The Y-axis drive coil C3 is formed at the base 22 at a position facing each of the Y-axis drive magnets Mv3 and mv3 shown in FIG. 4.

The X-axis rotation drive coil C1 shown in FIGS. 6 to 8 and the X-axis rotation drive magnets Mv1 and mv1 shown in FIG. 4 constitute an X-axis drive voice coil motor (VCM).

The X-axis drive VCM moves the movable member 2 in the direction X by an electromagnetic induction action between the X-axis rotation drive coil C1 and the X-axis rotation drive magnets Mv1 and mv1 by causing a control current to flow through the X-axis rotation drive coil C1.

The X-axis rotation drive coil C2 shown in FIGS. 6 to 8 and the X-axis rotation drive magnets Mv2 and mv2 shown in FIG. 4 constitute a VCM. This VCM and the X-axis drive VCM constitute a rotation drive VCM.

The rotation drive VCM rotates the movable member 2 around the rotation axis R with the center P of the light receiving surface 20a with a rotation center by an electromagnetic induction action between the X-axis rotation drive coil C1 and the X-axis rotation drive magnets Mv1 and mv1 and an electromagnetic induction action between the X-axis rotation drive coil C2 and the X-axis rotation drive magnets Mv2 and mv2 by reversing the directions of the control currents flowing through the X-axis rotation drive coil C1 and the X-axis rotation drive coil C2 shown in FIGS. 6 to 8.

The Y-axis drive coil C3 shown in FIGS. 6 to 8 and the Y-axis drive magnets Mv3 and mv3 shown in FIG. 4 constitute a Y-axis drive VCM.

The Y-axis drive VCM moves the movable member 2 in the direction Y by an electromagnetic induction action between the Y-axis drive coil C3 and the Y-axis drive magnets Mv3 and mv3 by causing the control current to flow through the Y-axis drive coil C3.

As shown in FIG. 7, the X-axis position detection Hall element H1 is fixed at a position facing the intermediate position between the S-pole 1s and the N-pole 1n of the X-axis position detection magnet Mh1 on a surface of the support member 1A side of the circuit board 21 fixed to the base 22 (hereinafter, referred to as a rear surface of the circuit board 21).

The Y-axis rotation position detection Hall element H2 is fixed at a position facing the intermediate position between the S-pole 2s and the N-pole 2n of the Y-axis rotation position detection magnet Mh2 on the rear surface of the circuit board 21.

The Y-axis rotation position detection Hall element H3 is fixed at a position facing the intermediate position between the S-pole 3s and the N-pole 3n of the Y-axis rotation position detection magnet Mh3 on the rear surface of the circuit board 21.

The X-axis position detection Hall element H1 outputs a signal corresponding to a magnetic field supplied from the X-axis position detection magnet Mh1, and the system controller 108 detects a position of the movable member 2 in the direction X by an output change of this signal.

The Y-axis rotation position detection Hall element H2 outputs a signal corresponding to a magnetic field supplied from the Y-axis rotation position detection magnet Mh2, and the system controller 108 detects a position of the movable member 2 in the direction Y by an output change of this signal.

The Y-axis rotation position detection Hall element H3 outputs a signal corresponding to a magnetic field supplied from the Y-axis rotation position detection magnet Mh3.

The system controller 108 detects, as a position of the movable member 2 in the direction θ, a rotation angle of the movable member 2 around the rotation axis R due to the change of the output signal of the Y-axis rotation position detection Hall element H3 and the change of the output signal of the Y-axis rotation position detection Hall element H2.

Figure 9:
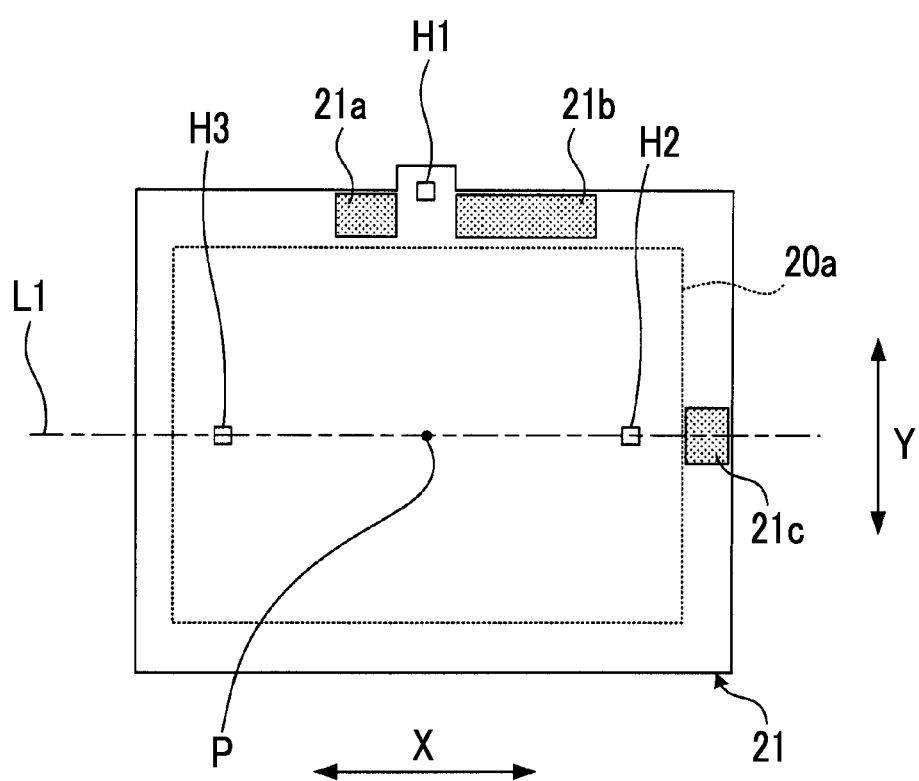
FIG. 9 is a diagram showing a state in which a rear surface of a circuit board 21 fixed to a base 22 of the movable member 2 shown in FIG. 7 is viewed in a direction Z.

FIG. 9 is a diagram showing a state in which the rear surface of the circuit board 21 fixed to the base 22 of the movable member 2 shown in FIG. 7 is viewed in the direction Z.

In FIG. 9, the center P of the light receiving surface 20a of the imaging element 20 that overlaps the rear surface of the circuit board 21 is shown. In FIG. 9, a straight line L1 which passes through the center P and is parallel to the direction X is illustrated, and the Y-axis rotation position detection Hall element H2 and the Y-axis rotation position detection Hall element H3 are arranged on the straight line L1. A distance from the Y-axis rotation position detection Hall element H2 to the center P and a distance from the Y-axis rotation position detection Hall element H3 to the center P are the same.

As shown in FIG. 4, the Y-axis rotation position detection magnet Mh2 facing the Y-axis rotation position detection Hall element H2 and the Y-axis rotation position detection magnet Mh3 facing the Y-axis rotation position detection Hall element H3 are arranged such that magnetic poles are opposite to each other in the direction Y.

In a case where the movable member 2 rotates in the right direction of the direction θ as viewed from the imaging optical system 101 side, the Y-axis rotation position detection Hall element H2 and the Y-axis rotation position detection Hall element H3 move in opposite directions to each other in the direction Y by the same distance. Thus, the outputs of the Y-axis rotation position detection Hall element H2 and the Y-axis rotation position detection Hall element H3 are changed in the same manner.

The output signal of the Y-axis rotation position detection Hall element H2, the movement direction and the movement distance of the Y-axis rotation position detection Hall element H2, the output signal of the Y-axis rotation position detection Hall element H3, the movement direction and the movement distance of the Y-axis rotation position detection Hall element H3, and the rotation angle of the movable member 2 in the direction θ are associated with each other in advance, and thus, it is possible to detect the rotation position of the movable member 2 in the direction θ by the output signals of the Y-axis rotation position detection Hall element H2 and the Y-axis rotation position detection Hall element H3.

Meanwhile, in a case where the movable member 2 moves only in the direction Y, the Y-axis rotation position detection Hall element H2 and the Y-axis rotation position detection Hall element H3 move in the same direction in the direction Y by the same distance.

Thus, the output signals of the Y-axis rotation position detection Hall element H2 and the Y-axis rotation position detection Hall element H3 are changed in opposite directions.

Therefore, in a case where the outputs of the Y-axis rotation position detection Hall element H2 and the Y-axis rotation position detection Hall element H3 are changed in opposite directions, it is possible to detect the position of the movable member 2 in the direction Y by viewing the output of the Y-axis rotation position detection Hall element H2 or the Y-axis rotation position detection Hall element H3.

As shown in FIGS. 6 to 8, a hook 23a extending in the same direction (direction X) as the hook 16a is formed at the base 22 at a position facing the hook 16a (see FIG. 4) of the support member 1A. The other end of the spring 24a shown in FIG. 3 is locked to the hook 23a.

The movable member 2 is biased toward the support member 1A by the spring 24a locked to the hooks 16a and 23a.

As shown in FIGS. 6 and 8, a hook 23b extending in the same direction (up direction of the direction Y) as the hook 16b is formed at the base 22 at a position facing the hook 16b (see FIG. 4) of the support member 1A. The other end of the spring 24b shown in FIG. 3 is locked to the hook 23b.

The movable member 2 is biased toward the support member 1A by the spring 24b locked to the hooks 16b and 23b.

As shown in FIGS. 6 to 8, a hook 23c extending in the same direction (down direction of the direction Y) as the hook 16c is formed at the base 22 at a position facing the hook 16c (see FIG. 4) of the support member 1A. The other end of the spring 24c shown in FIG. 3 is locked to the hook 23c.

The movable member 2 is biased toward the support member 1A by the spring 24c locked to the hooks 16c and 23c.

The pair of the hook 16a and the hook 23a, the pair of the hook 16b and the hook 23b, and the pair of the hook 16c and the hook 23c are formed such that a center of gravity of the movable member 2 is disposed inside a triangle formed by connecting these three pairs in plan view viewed in the direction Z.

As shown in FIGS. 7 and 8, a recess portion 290a that accommodates a rolling element (spherical ball) for causing the movable member 2 to be movable on a surface perpendicular to the direction Z at a position facing the flat surface 15a of the support member 1A shown in FIG. 4 is formed at the base 22. A bottom surface 29a of the recess portion 290a is a flat surface perpendicular to the direction Z.

A recess portion 290b that accommodates a rolling element for causing the movable member 2 to be movable on the surface perpendicular to the direction Z at a position facing the flat surface 15b of the support member 1A shown in FIG. 4 is formed at the base 22. A bottom surface 29b of the recess portion 290b is a flat surface perpendicular to the direction Z.

A recess portion 290c that accommodates a rolling element for causing the movable member 2 to be movable on the surface perpendicular to the direction Z is formed at the base 22 at a position facing the flat surface 15c of the support member 1A shown in FIG. 4. A bottom surface 29c of the recess portion 290c is a flat surface perpendicular to the direction Z.

The positions of the bottom surfaces 29a, 29b, and 29c in the direction Z are all the same, and the bottom surfaces are all formed on the same flat surface.

The movable member 2 moves on the flat surface perpendicular to the direction Z by rolling the rolling elements disposed between the bottom surface 29a of the movable member 2 and the flat surface 15a of the support member 1A, between the bottom surface 29b of the movable member 2 and the flat surface 15b of the support member 1A, and between the bottom surface 29c of the movable member 2 and the flat surface 15c of the support member 1A.

As shown in FIG. 7, a connector 21a and a connector 21b are formed at an upper end portion of the rear surface of the circuit board 21 fixed to the movable member 2 in the direction Y. A connector 21c is formed at an end portion on a side close to the base 22 among the end portions on the rear surface of the circuit board 21 in the direction X.

The connector 21a and the connector 21b include terminals connected to various terminals (a power supply terminal which is a terminal for supplying a power, a ground terminal which is a terminal for grounding, a terminal for outputting a signal, and a drive terminal) of the imaging element 20 mounted on the circuit board 21.

The flexible print substrate 26 which is a first flexible substrate including wirings connected to the terminals included in the connector is connected to the connector 21a.

The flexible print substrate 25 which is a first flexible substrate including wirings connected to the terminals included in the connector is connected to the connector 21b.

The connector 21c includes a terminal connected to an output terminal of each of the X-axis position detection Hall element H1, the Y-axis rotation position detection Hall element H2, and the Y-axis rotation position detection Hall element H3 mounted on the rear surface of the circuit board 21.

The flexible print substrate 27 which is a second flexible substrate including wirings connected to the terminals included in the connector is connected to the connector 21c.

The flexible print substrate 27 includes a fixed portion 27a that extends along the direction Y and is fixed to the base 22, and a non-fixed portion 27b that is free with respect to the base 22.

As shown in FIG. 8, an attachment portion 28A is formed on the surface of the support member 1A side of the base 22. As shown in FIG. 7, a flat plate portion 280a extending in the down direction of the direction Y at a position overlapping the circuit board 21 is fixed to the attachment portion 28A with screws. An insertion member 28a protruding in the direction Z toward the support member 1A side is formed at the flat plate portion 280a.

As shown in FIG. 8, an attachment portion 28B is formed on the surface of the support member 1A side of the base 22. As shown in FIG. 7, a flat plate portion 280b extending in the up direction of the direction Y at a position overlapping the circuit board 21 is fixed to the attachment portion 28B with screws. An insertion member 28b protruding in the direction Z toward the support member 1A side is formed at the flat plate portion 280b.

The insertion member 28a is inserted into the hole portion 11a of the support member 1A shown in FIG. 4. The insertion member 28b is inserted into the hole portion 11b of the support member 1A shown in FIG. 4.

In a case where the movable member 2 moves on the surface perpendicular to the direction Z, the movement range of the insertion member 28a is limited to the inside of the hole portion 11a, and the movement range of the insertion member 28b is limited to the inside of the hole portion 11b. Thus, the movement range of the movable member 2 (the movement range in the direction X, the movement range in the direction Y, and the movement range in the direction θ) is restricted to a predetermined range by the pair of the insertion member 28a and the hole portion 11a and the pair of the insertion member 28b and the hole portion 11b.

The movement prevention member 1B is a movement restrictor that restricts the movement of the movable member 2 in the direction X, the direction Y, and the direction θ and the movement in the direction Z perpendicular to the light receiving surface 20a by the pair of the insertion member 28a and the hole portion 11a and the pair of the insertion member 28b and the hole portion 11b.

Next, a configuration of the movement restrictor will be described in detail.

Figure 10:
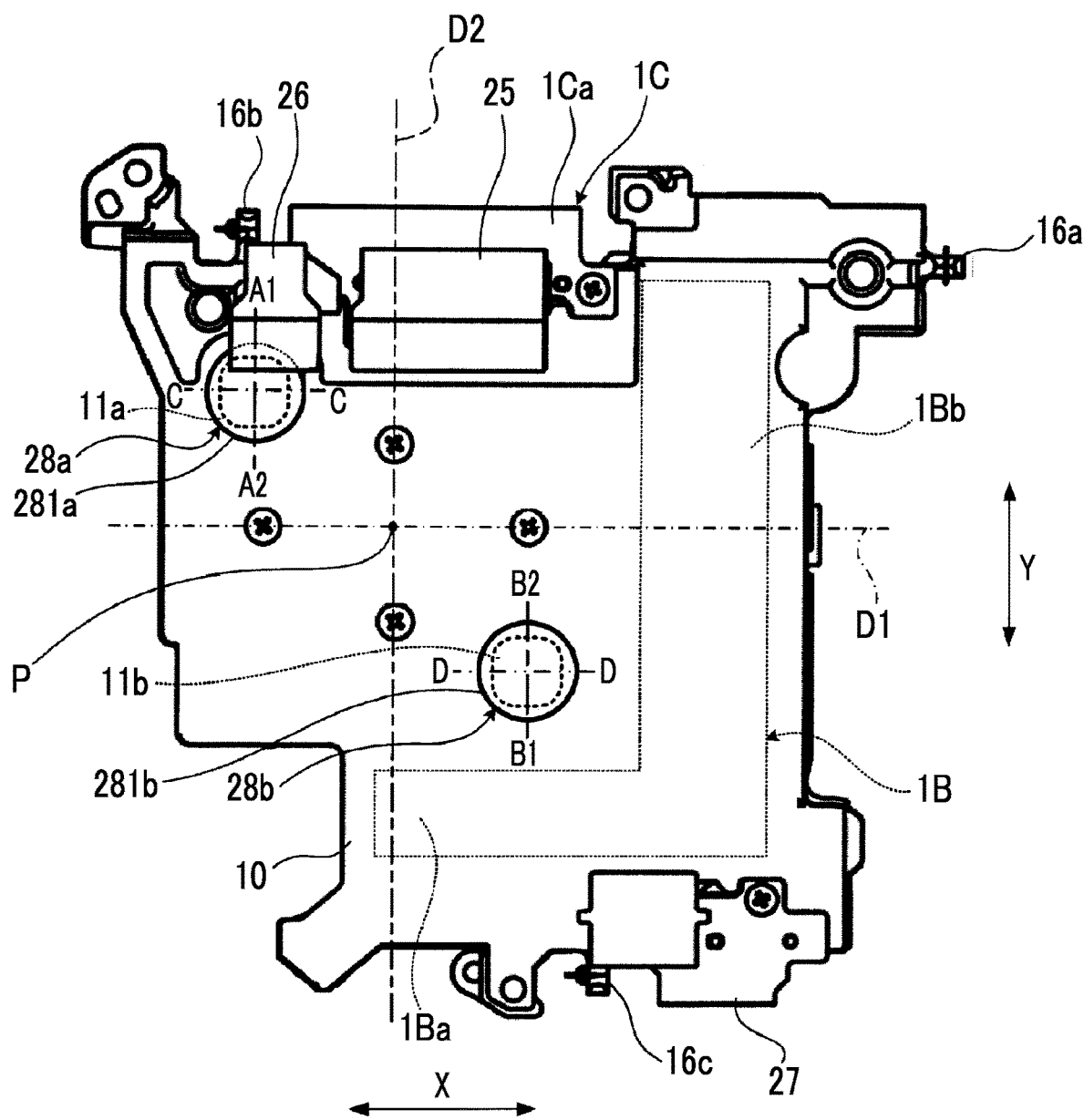
FIG. 10 is a rear view of the image shake correction device 3 shown in FIG. 3 as viewed in the direction Z from the side opposite to the imaging optical system 101 side.
Figure 11:
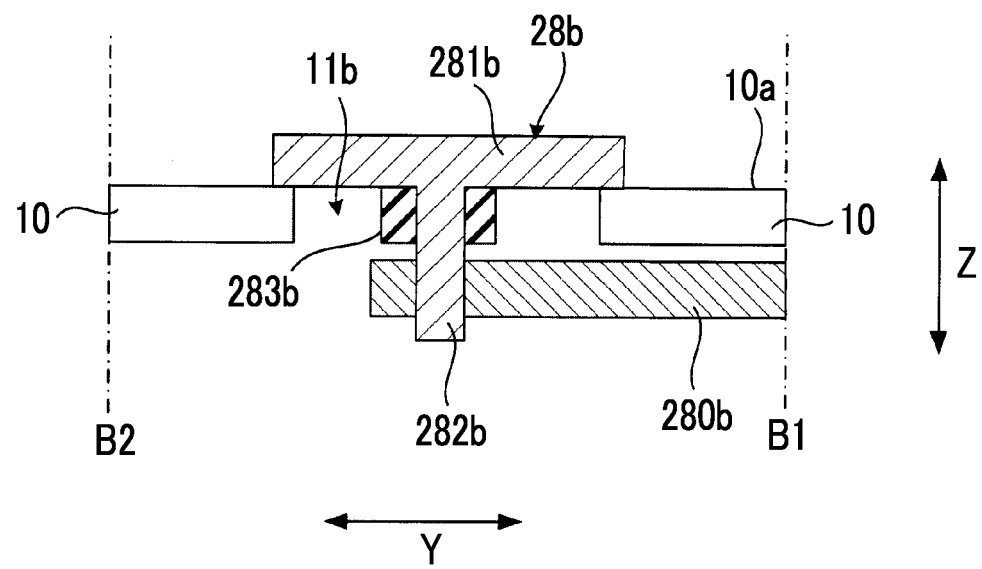
FIG. 11 is a schematic cross-sectional view of the image shake correction device 3 shown in FIG. 10 taken along a line B1-B2.
Figure 12:
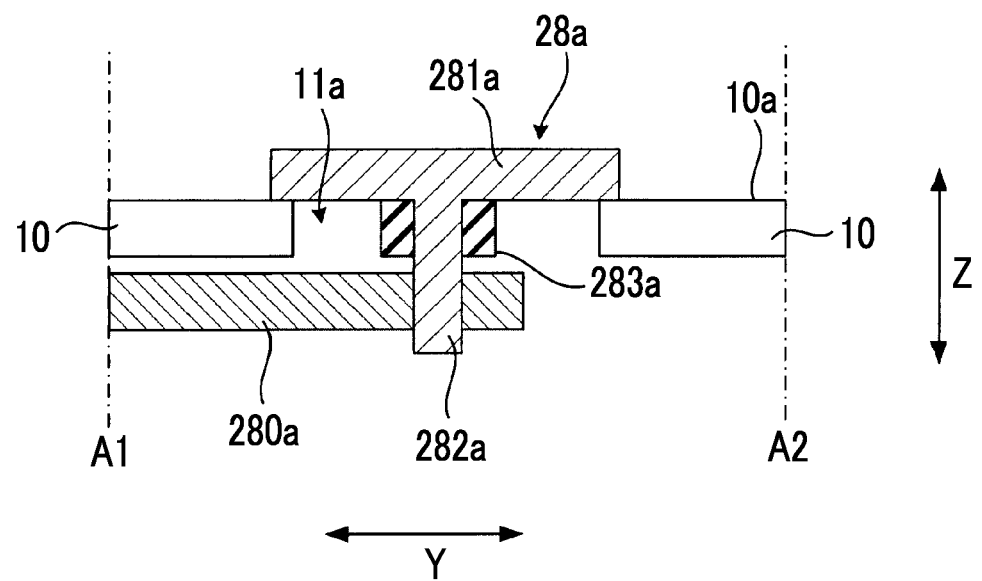
FIG. 12 is a schematic cross-sectional view of the image shake correction device 3 shown in FIG. 10 taken along a line A1-A2.
Figure 13:
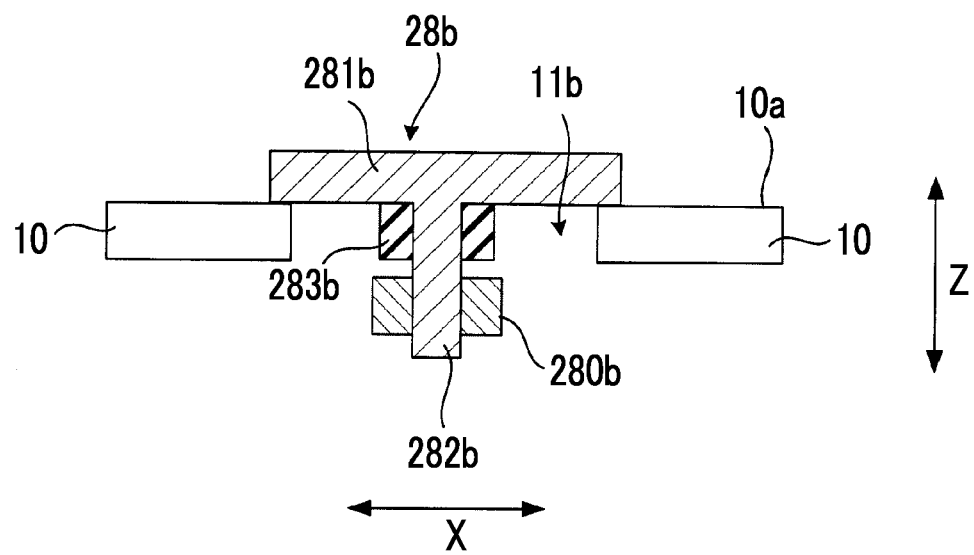
FIG. 13 is a schematic cross-sectional view of the image shake correction device 3 shown in FIG. 10 taken along a line D-D.
Figure 14:
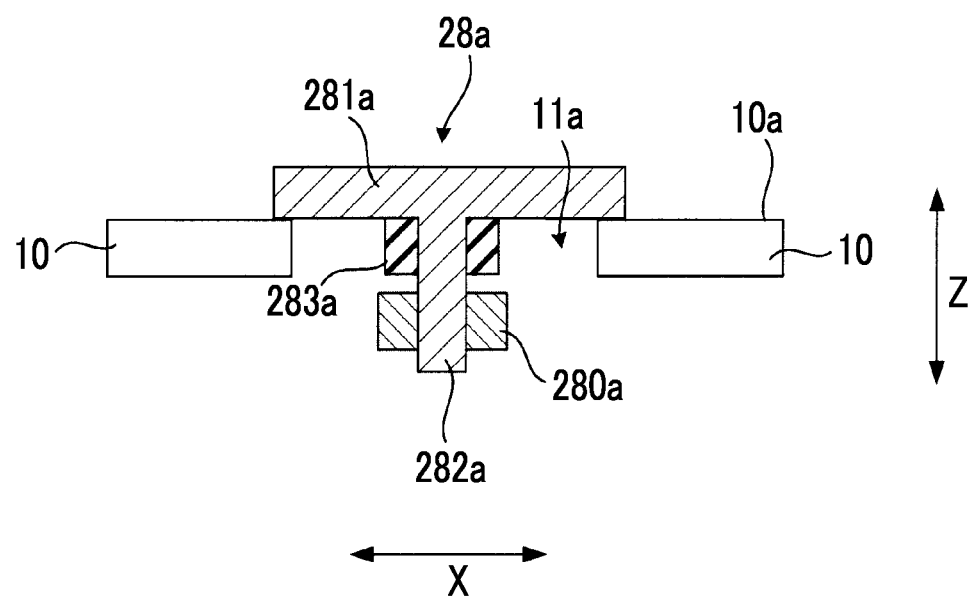
FIG. 14 is a schematic cross-sectional view of the image shake correction device 3 shown in FIG. 10 taken along a line C-C.

FIG. 10 is a rear view of the image shake correction device 3 shown in FIG. 3 as viewed in the direction Z from the side opposite to the imaging optical system 101 side. FIG. 11 is a schematic cross-sectional view of the image shake correction device 3 shown in FIG. 10 taken along a line B1-B2. FIG. 12 is a schematic cross-sectional view of the image shake correction device 3 shown in FIG. 10 taken along a line A1-A2. FIG. 13 is a schematic cross-sectional view of the image shake correction device 3 shown in FIG. 10 taken along a line D-D. FIG. 14 is a schematic cross-sectional view of the image shake correction device 3 shown in FIG. 10 taken along a line C-C. FIGS. 11 to 14 show only components related to the movement restrictor.

As shown in FIG. 11, the insertion member 28b comprises a columnar shaft portion 282b which is fixed to the flat plate portion 280*b* and extends in the direction Z, a wide width portion 281*b* formed at a distal end of the shaft portion 282*b*, and a cylindrical abutting portion 283*b* having an inner peripheral portion into which the shaft portion 282*b* is fitted.

The abutting portion 283*b* is made of, for example, an elastic body such as rubber, and may be positioned in the hole portion 11*b* and may enter a state in which the abutting portion abuts on an inner surface of the hole portion 11*b* and a state in which the abutting portion does not abut on this inner surface by moving in each of the direction X, the direction Y, and the direction θ in the hole portion 11*b* with the movement of the movable member 2 even in a state in which the movable member 2 is located at any position of the movable range.

The wide width portion 281*b* is disposed outside the hole portion 11*b* (outside opposite to the movable member 2 side on which the insertion member 28*b* is formed). As shown in FIGS. 11 and 13, widths of the wide width portion 281*b* in the direction X and the direction Y are wider than those of the abutting portion 283*b*.

Specifically, a right end portion of the wide width portion 281*b* in the direction Y in FIG. 11 is located so as to be closer to the right side than a right end portion of the abutting portion 283*b* in the direction Y in FIG. 11. A left end portion of the wide width portion 281*b* in the direction Y in FIG. 11 is located so as to be closer to the left side than a left end portion of the abutting portion 283*b* in the direction Y of FIG. 11.

As shown in FIG. 13, both end portions of the wide width portion 281*b* in the direction X are located so as to be closer to the outside than both end portions of the abutting portion 283*b* in the direction X.

A width of the wide width portion 281*b* in the direction X is greater than a width of the hole portion 11*b* in the direction X, and a width of the wide width portion 281*b* in the direction Y is greater than a width of the hole portion 11*b* in the direction Y. That is, a plane area of the wide width portion 281*b* as viewed from the direction Z is greater than a plane area of the hole portion 11*b* as viewed from the direction Z. As described above, the wide width portion 281*b* of the insertion member 28*b* has a size that overlaps with the base 10 in which the hole portion 11*b* is formed as viewed from the direction Z even in a state in which the abutting portion 283*b* is positioned at any position in the hole portion 11*b*.

As shown in FIG. 12, the insertion member 28*a* includes a columnar shaft portion 282*a* which is fixed to the flat plate portion 280*a* and extends in the direction Z, a wide width portion 281*a* formed at a distal end of the shaft portion 282*a*, and a cylindrical abutting portion 283*a* having an inner peripheral portion into which the shaft portion 282*a* is fitted.

The abutting portion 283*a* is made of, for example, an elastic body such as rubber, and may be located in the hole portion 11*a* and may enter a state in which the abutting portion abuts on an inner surface of the hole portion 11*a* and a state in which the abutting portion does not abut on this inner surface by moving in each of the direction X, the direction Y, and the direction θ in the hole portion 11*a* with the movement of the movable member 2 even in a state in which the movable member 2 is located at any position of the movable range.

The wide width portion 281*a* is disposed outside the hole portion 11*a* (outside opposite to the movable member 2 side on which the insertion member 28*a* is formed). As shown in FIGS. 12 and 14, widths of the wide width portion 281*a* in the direction X and the direction Y are wider than those of the abutting portion 283*a*.

Specifically, a right end portion of the wide width portion 281*a* in the direction Y in FIG. 12 is located so as to be closer to the right side than a right end portion of the abutting portion 283*a* in the direction Y in FIG. 12. A left end portion of the wide width portion 281*a* in the direction Y in FIG. 12 is located so as to be closer to the left side than a left end portion of the abutting portion 283*a* in the direction Y in FIG. 12.

As shown in FIG. 14, both end portions of the wide width portion 281*a* in the direction X are located so as to be closer to the outside than both end portions of the abutting portion 283*a* in the direction X.

A width of the wide width portion 281*a* in the direction X is greater than a width of the hole portion 11*a* in the direction X, and a width of the wide width portion 281*a* in the direction Y is greater than a width of the hole portion 11*a* in the direction Y. That is, a plane area of the wide width portion 281*a* as viewed from the direction Z is greater than a plane area of the hole portion 11*a* as viewed from the direction Z. As described above, the wide width portion 281*a* of the insertion member 28*a* has a size that overlaps with the base 10 in which the hole portion 11*a* is formed as viewed from the direction Z even in a state in which the abutting portion 283*a* is positioned at any position in the hole portion 11*a*.

As shown in FIG. 10, the hole portion 11*a* formed in the movable member 2 is formed in a region which is on a side opposite to the first portion 1Ba from a straight line D1 passing through the center P of the light receiving surface 20*a* and extending in the direction X and which is a side opposite to the second portion 1Bb from a straight line D2 passing through the center P of the light receiving surface 20*a* and extending in the direction Y (a region above the straight line D1 and on a left side of the straight line D2) as viewed from the direction Z. Specifically, the hole portion 11*a* is formed at an end portion opposite to the second portion 1Bb side in the direction X and an end portion opposite to the first portion 1Ba side in the direction Y in this region.

The hole portion 11*b* formed in the movable member 2 is formed in a region which is on the first portion 1Ba side from the straight line D1 and is on the second portion 1Bb side from the straight line D2 (a region below the straight line D1 and on a right side of the straight line D2).

From the reference state shown in FIG. 10, in a state in which the movable member 2 moves to the maximum in the up direction of the direction Y and the left direction of the direction X, the function of preventing the movable member 2 from moving in the direction Z by using the movement prevention member 1B becomes difficult to work.

However, in this state, as described above, the wide width portion 281*a* of the insertion member 28*a* and the wide width portion 281*b* of the insertion member 28*b* overlap the rear surface 10*a* of the base 10 as viewed in the direction Z.

Accordingly, even though gravity is applied to the movable member 2 in the down direction of the direction Z from this state, the wide width portion 281*a* and the wide width portion 281*b* are hooked on the base 10, and thus, the movable member 2 is prevented from moving in the gravity direction.

As described above, according to the digital camera 100, the movable member 2 can be prevented from largely moving in a direction away from the base 10 by the L-shaped movement prevention member 1B. In a state in which the movement of the movable member 2 cannot be prevented by the movement prevention member 1B, since the insertion member 28*a*, the insertion member 28*b*, and the base 10 overlap, the movable member 2 can be prevented from largely moving in the direction away from the base 10. As a result, it is possible to prevent the rolling element from falling. The insertion member 28*a*, the insertion member 28*b*, and the base 10 overlap each other even though the movable member 2 is positioned at any movement position. Thus, the movement prevention member 1B can have a minimum size enough to have a function as a yoke, and the size and weight of the image shake correction device 3 can be reduced.

Hereinafter, a modification example of the image shake correction device 3 will be described.

In the movement restrictor of the image shake correction device 3, the pair of the hole portion 11*b* and the insertion member 28*b* may not be provided, and may be omitted. The lifting of the movable member 2 in the direction Z may occur at a location far from a portion at which the movable member 2 is sandwiched by the movement prevention member 1B in cooperation with the support member 1A. Thus, in a case where at least the hole portion 11*a* and the insertion member 28*a* are present in the region on the left side of the straight line D2 and above the straight line D1 in FIG. 10, the movable member 2 can be prevented from being lifted in the direction Z.

The hole portion 11*a* may be formed in the region on the left side of the straight line D2 and above the straight line D1 in FIG. 10, and may not be formed at a left end portion and an upper end portion in this region as illustrated in FIG. 10. Since the hole portion 11*a* is formed at the left end portion and the upper end portion in this region, the movable member 2 can be more effectively prevented from lifting in the direction Z.

It has been described above that the size of the wide width portion 281*a* of the insertion member 28*a* as viewed in the direction Z is greater than the size of the hole portion 11. However, the wide width portion 281*a* of the insertion member 28*a* may be smaller than the hole portion 11*a* in a case where the wide width portion has the size that overlaps with the base 10 in which the hole portion 11*a* is formed as viewed from the direction Z even in a state in which the abutting portion 283*a* is positioned at any position in the hole portion 11*a*. As described above, the size of the wide width portion 281*a* is greater than the size of the hole portion 11, and thus, the insertion member 28*a* can be easily designed and the manufacturing cost can be reduced.

Figure 15:
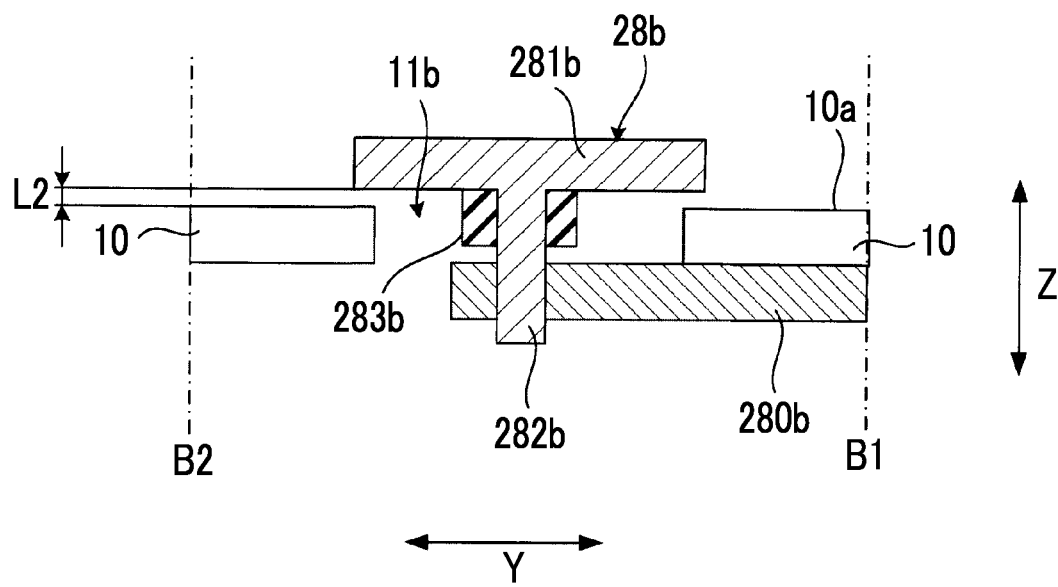
FIG. 15 is a diagram showing a state in which a wide width portion 281b moves to the maximum in a direction away from a rear surface 10a in the direction Z.
Figure 16:
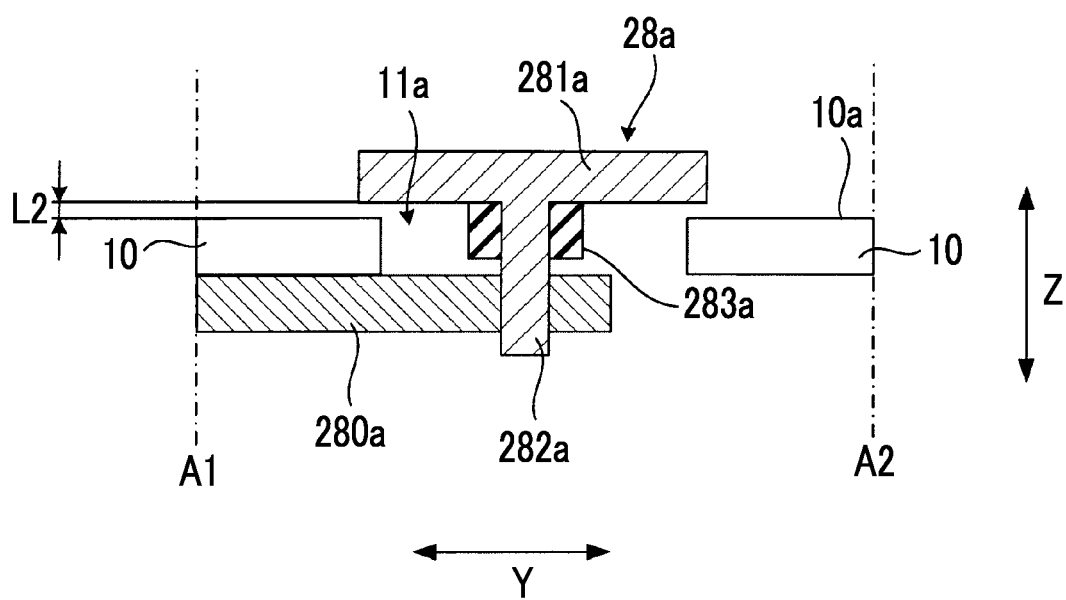
FIG. 16 is a diagram showing a state in which the wide width portion 281a moves to the maximum in the direction away from the rear surface 10a in the direction Z.

As shown in FIGS. 11 to 14, there is a gap between the flat plate portion 280*a* and the flat plate portion 280*b* fixed to the movable member 2 and the base 10. Thus, depending on the posture of the digital camera 100, as shown in FIGS. 15 and 16, the wide width portion 281*a* of the insertion member 28*a* and the wide width portion 281*b* of the insertion member 28*b* are movable in the direction away from the rear surface 10*a* of the base 10 in the direction Z by a distance L2 corresponding to this gap. The distance L2 has a size enough to prevent the rolling element from falling.

It is preferable that the distance L2 (the maximum distance between the base 10 and the wide width portion 281*a* and between the base and the wide width portion 281*b*) is equal to or less than a distance between the X-axis rotation drive magnet mv1, the X-axis rotation drive magnet mv2, and the Y-axis drive magnet mv3 which form the second drive magnet and the X-axis rotation drive coil C1, the X-axis rotation drive coil C2, and the Y-axis drive coil C3 which form the drive coil. According to this configuration, an effect of preventing the movable member 2 from being lifted due to the insertion member 28*a* and the hole portion 11*a* can be further enhanced.

Although it has been described that the image shake correction device 3 moves the movable member 2 in three directions, it is possible to achieve the size reduction and weight reduction while preventing the movable member 2 from being lifted by the configuration of the aforementioned movement restrictor even in the image shake correction device that moves the movable member 2 only in two directions of the direction X and the direction Y.

Although it has been described that the hole portions 11*a* and 11*b* are formed in the support member 1A and the insertion members 28*a* and 28*b* are fixed to the movable member 2, even though the insertion members 28*a* and 28*b* are fixed to the support member 1A and the hole portions 11*a* and 11*b* are formed in the movable member 2, the aforementioned effects can be obtained.

Next, a configuration of a smartphone will be described as another embodiment of the imaging device according to the embodiment of the present invention.

Figure 17:
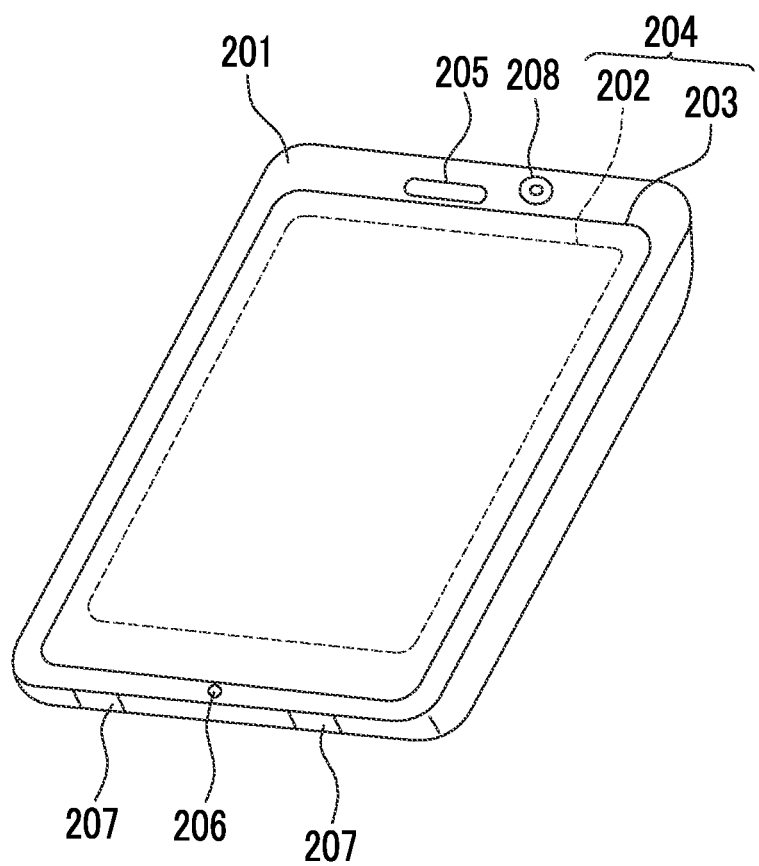
FIG. 17 shows an appearance of a smartphone 200 that is an embodiment of the imaging device according to the embodiment of the present invention.

FIG. 17 shows an appearance of a smartphone 200 that is an embodiment of the imaging device according to the embodiment of the present invention.

A smartphone 200 shown in FIG. 17 includes a flat plate casing 201, and comprises a display input unit 204 in which a display panel 202 as a display surface and an operation panel 203 as an input unit are integrated on one surface of the casing 201.

Such a casing 201 comprises a speaker 205, a microphone 206, an operation unit 207, and a camera unit 208.

The configuration of the casing 201 is not limited thereto, and for example, a configuration in which the display surface and the input unit are independent can be employed, or a configuration having a folding structure or a slide mechanism can be employed.

Figure 18:
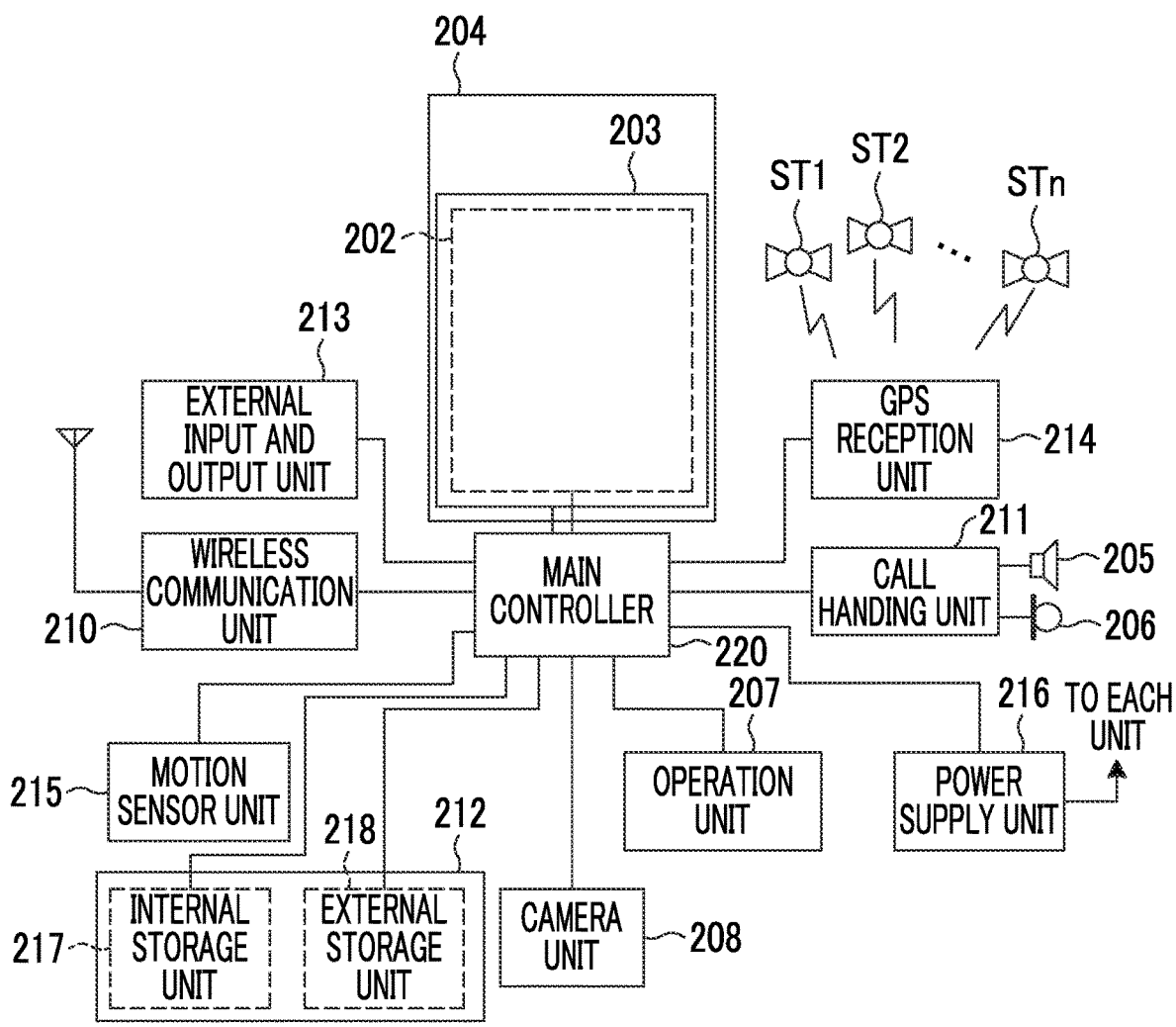
FIG. 18 is a block diagram showing a configuration of the smartphone 200 shown in FIG. 17.

FIG. 18 is a block diagram showing a configuration of the smartphone 200 shown in FIG. 17.

As shown in FIG. 18, the smartphone includes, as main components, a wireless communication unit 210, the display input unit 204, a call handling unit 211, the operation unit 207, the camera unit 208, a storage unit 212, an external input and output unit 213, a Global Positioning System (GPS) reception unit 214, a motion sensor unit 215, a power supply unit 216, and a main controller 220.

The smartphone 200 has, as a main function, a wireless communication function of performing mobile wireless communication through a base station apparatus BS (not shown) and a mobile communication network NW (not shown).

The wireless communication unit 210 performs wireless communication with the base station apparatus BS belonging to the mobile communication network NW according to an instruction of the main controller 220. The transmission and reception of various file data such as voice data, image data, and e-mail data, and reception of Web data or streaming data are performed by using this wireless communication.

Under the control of the main controller 220, the display input unit 204 displays images (still images and moving images) or text information, and visually transfers the images and information to the user, and is a so-called touch panel that detects a user operation for the displayed information. The display input unit comprises the display panel 202 and the operation panel 203.

The display panel 202 uses, as a display device, a liquid crystal display (LCD) or an organic electro-luminescence display (OELD).

The operation panel 203 is a device that is mounted so as to visually recognize the image displayed on the display surface of the display panel 202, and detects one or a plurality of coordinates operated by a finger of the user or a stylus. In a case where this device is operated by the finger of the user or the stylus, a detection signal generated due to the operation is output to the main controller 220. Subsequently, the main controller 220 detects an operation position (coordinates) on the display panel 202 based on the received detection signal.

As shown in FIG. 18, although it has been described that the display panel 202 and the operation panel 203 of the smartphone 200 shown as the embodiment of the imaging device according to the embodiment of the present invention are integrally formed and constitute the display input unit 204, the operation panel 203 is disposed to completely cover the display panel 202.

In a case where such an arrangement is adopted, the operation panel 203 may have a function of detecting the user operation even in a region outside the display panel 202. In other words, the operation panel 203 may have a detection region (hereinafter, referred to as a display region) for an overlapped portion which overlaps with the display panel 202 and a detection region (hereinafter, referred to as a non-display region) for an outer edge portion which does not overlap with the display panel 202.

The size of the display region and the size of the display panel 202 may completely match each other, but it is not necessary to match both the sizes.

The operation panel 203 may have the outer edge portion and two sensitive regions which are inner portions other than the outer edge portion. A width of the outer edge portion is appropriately designed according to the size of the casing 201.

Examples of the position detection method employed in the operation panel 203 include a matrix switch method, a resistive film method, a surface acoustic wave method, an infrared method, an electromagnetic induction method, and an electrostatic capacitance method, and any method can be adopted.

The call handling unit 211 comprises the speaker 205 or the microphone 206, converts the voice of the user input through the microphone 206 into voice data capable of being processed by the main controller 220 to output the voice data to the main controller 220 or decodes the voice data received by the wireless communication unit 210 or the external input and output unit 213 to output the decoded voice data from the speaker 205.

For example, as shown in FIG. 17, the speaker 205 may be mounted on the same surface as the surface on which the display input unit 204 is provided, and the microphone 206 may be mounted on a side surface of the casing 201.

The operation unit 207 is a hardware key using a key switch, and receives an instruction from the user.

For example, as shown in FIG. 17, the operation unit 207 is a push button type switch which is mounted on a side surface of the casing 201 of the smartphone 200, and is turned on by being pressed with the finger and is turned off by a restoring force such as a spring in a case where the finger is released.

The storage unit 212 stores a control program and control data of the main controller 220, application software, address data associated with a name or a telephone number of a communication partner, the transmitted and received e-mail data, Web data downloaded by Web browsing, and download content data, and temporarily stores streaming data. The storage unit 212 includes an internal storage unit 217 built in the smartphone, and an external storage unit 218 for an attachable and detachable external memory slot.

The internal storage unit 217 and the external storage unit 218 constituting the storage unit 212 is realized by using a storage medium such as a memory (for example, MicroSD (registered trademark) memory) of a flash memory type, a hard disk type, a multimedia card micro type, or a card type, a random access memory (RAM), or a read only memory (ROM).

The external input and output unit 213 serves as an interface with all external devices coupled to the smartphone 200, and directly or indirectly communicates with other external devices by (for example, universal serial bus (USB) or Institute of Electrical and Electronics Engineers (IEEE) 1394) or a network (for example, Internet, wireless local area network (LAN), Bluetooth (registered trademark), radio frequency identification (RFID), Infrared Data Association (IrDA) (registered trademark), ultra wideband (UWB) (registered trademark), or ZigBee (registered trademark)).

Examples of the external device to be connected to the smartphone 200 includes a wired or wireless headset, an external wired or wireless charger, a wired or wireless data port, a memory card to be connected through a card socket, subscriber identity module (SIM)/user identity module (UIM) card, or an external audio and video device to be connected through an audio and video input and output (I/O) terminal, an external audio and video device to be connected in a wireless manner, a smartphone to be connected in a wired or wireless manner, or an earphone to be connected in a wired or wireless manner.

The external input and output unit 213 can transfer data transmitted from the external devices to the components in the smartphone 200 or can transmit data in the smartphone 200 to the external devices.

The GPS reception unit 214 receives GPS signals transmitted from GPS satellites ST1 to STn according to an instruction of the main controller 220, performs positioning calculation processing based on a plurality of received GPS signals, and detects the position of the smartphone 200 having latitude, longitude, and altitude.

In a case where positional information can be acquired from the wireless communication unit 210 or the external input and output unit 213 (for example, a wireless LAN), the GPS reception unit 214 can detect the position by using the positional information.

For example, the motion sensor unit 215 comprises a three-axis acceleration sensor, and detects physical motion of the smartphone 200 according to an instruction of the main controller 220.

The movement direction or acceleration of the smartphone 200 is detected by detecting the physical motion of the smartphone 200. The detection result is output to the main controller 220.

The power supply unit 216 supplies power stored in a battery (not shown) to the respective units of the smartphone 200 according to an instruction of the main controller 220.

The main controller 220 comprises a microprocessor, operates according to the control program or control data stored in the storage unit 212, and integrally controls the units of the smartphone 200.

The main controller 220 has a mobile communication control function of controlling the units of a communication system in order to perform voice communication or data communication through the wireless communication unit 210, and an application processing function.

The application processing function is realized by the main controller 220 operating according to application software stored in the storage unit 212.

The application processing function is, for example, an infrared communication function of controlling the external input and output unit 213 to perform data communication with a device facing the smartphone, an e-mail function of transmitting and receiving e-mails, or a Web browsing function of browsing Web pages.

The main controller 220 has an image processing function of displaying video on the display input unit 204 based on image data (still image or moving image data), such as received data or downloaded streaming data.

The image processing function refers to a function of the main controller 220 decoding the image data, performing image processing on the decoding result, and displaying an image on the display input unit 204.

The main controller 220 performs display control on the display panel 202 and operation detection control for detecting a user operation through the operation unit 207 and the operation panel 203.

Through the performing of the display control, the main controller 220 displays an icon for activating application software or a software key, such as a scroll bar, or displays a window for creating e-mails.

The scroll bar refers to a software key for receiving an instruction to move a display portion of an image which is too large to fit into the display region of the display panel 202.

Through the performing of the operation detection control, the main controller 220 detects the user operation through the operation unit 207, receives an operation on the icon or an input of a character string in an input field of the window through the operation panel 203, or receives a scroll request of a display image through the scroll bar.

Through the performing of the operation detection control, the main controller 220 has a touch panel control function of determining whether or not an operation position on the operation panel 203 is the overlapped portion (display region) overlapping the display panel 202 or the outer edge portion (non-display region) not overlapping the display panel 202 other than the display region, and controlling the sensitive region of the operation panel 203 or the display position of the software key.

The main controller 220 may detect a gesture operation on the operation panel 203 and may execute a function set in advance according to the detected gesture operation.

The gesture operation is not a conventional simple touch operation, but means an operation to render a track with a finger, an operation to simultaneously designate a plurality of positions, or an operation to render a track for at least one of a plurality of positions by combining the aforementioned operations.

The camera unit 208 includes components other than the motion detection sensor 106, the system controller 108, and the image processing unit 107 of the digital camera 100 shown in FIG. 1.

In the smartphone 200, the main controller 220 controls the image shake correction device 3 based on information from the motion sensor unit 215 corresponding to the motion detection sensor 106 to perform image shake correction.

Captured image data generated by the camera unit 208 can be stored in the storage unit 212 or can be output through the external input and output unit 213 or the wireless communication unit 210.

Although it has been described in the smartphone 200 shown in FIG. 17 that the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS reception unit 214 detects the position, the position may be detected by referring to an image from the camera unit 208. The optical axis direction of the camera unit 208 of the smartphone 200 can be determined or a current usage environment may be determined by referring to an image from the camera unit 208 without using the three-axis acceleration sensor or in combination with the three-axis acceleration sensor. An image from the camera unit 208 may be used in application software.

Image data of a still image or a motion picture may be attached with positional information acquired by the GPS reception unit 214, voice information (which may be converted to text information through voice-text conversion by the main controller) acquired by the microphone 206, or posture information acquired by the motion sensor unit 215 and can be recorded in the storage unit 212, or may be output through the external input and output unit 213 or the wireless communication unit 210.

As described above, the following items are disclosed in this specification.

(1) There is provided an image shake correction device comprising a movable member to which an imaging element is fixed, a support member that supports the movable member to be movable in a plurality of directions including a first direction and a second direction orthogonal to each other along a light receiving surface of the imaging element, and is disposed on a side opposite to the light receiving surface side with respect to the movable member, and a movement restrictor that restricts movement of the movable member in the plurality of directions and a direction perpendicular to the light receiving surface. The movement restrictor includes a movement prevention member that is fixed to the support member and prevents the movable member from moving in the direction perpendicular to the light receiving surface while sandwiching the movable member in cooperation with the support member, a hole portion that is formed in one member of the movable member or the support member, and an insertion member that is formed at the other member of the movable member or the support member and is inserted into the hole portion. The movement prevention member consists of a first portion that is adjacent to a first side of the light receiving surface and extends along the first side, and a second portion that is adjacent to a second side orthogonal to the first side of the light receiving surface and extends along the second side. The hole portion is formed in a region which is on a side opposite to the first portion from a straight line passing through a center of the light receiving surface and extending in a direction parallel to the first side and is on a side opposite to the second portion from a straight line passing through the center of the light receiving surface and extending in a direction parallel to the second side as viewed from the direction perpendicular to the light receiving surface. The insertion member includes an abutting portion that is positioned in the hole portion and enters a state in which the abutting portion abuts on an inner surface of the hole portion and a state in which the abutting portion does not abut on the inner surface by moving in the plurality of directions in the hole portion with the movement of the movable member, and a wide width portion that is disposed outside the hole portion opposite to the other member side on which the insertion member is formed. The wide width portion has a size that overlaps with the one member on which the hole portion is formed as viewed from the direction perpendicular to the light receiving surface even in a state in which the abutting portion is positioned at any position in the hole portion.

(2) In the image shake correction device according to (1), the hole portion is formed at an end portion opposite to the second portion in the direction parallel to the first side in the region, and the end portion is opposite to the first portion in the direction parallel to the second side in the region.

(3) In the image shake correction device according to (1) or (2), the wide width portion is larger than the hole portion as viewed from the direction perpendicular to the light receiving surface.

(4) The image shake correction device according to any one of (1) to (3) further comprises a first drive magnet of the movable member that is disposed at a portion of the support member facing the movement prevention member, a second drive magnet of the movable member that is disposed at a portion of the movement prevention member facing the first drive magnet, and a drive coil of the movable member that is disposed at a position of the movable member sandwiched by the first drive magnet and the second drive magnet. The movement prevention member is made of a material that prevents a magnetic flux leakage of the first drive magnet and the second drive magnet, and a maximum distance between the one member in which the hole portion is formed and the wide width portion is equal to or less than a distance between the second drive magnet and the drive coil.

(5) There is provided an imaging device comprising the image shake correction device according to any one of (1) to (4).

Although various embodiments have been described with reference to the drawings, the present invention is not limited to such examples. It is clear that those skilled in the art can conceive various changes or modifications within the scope described in the claims, and it should be understood that these changes and modifications belong to the technical scope of the present invention. Each component in the aforementioned embodiment may be optionally combined without departing from the spirit of the invention.

This application is based on a Japanese patent application filed on Jul. 27, 2018 (Japanese Patent Application No. 2018-141584), the contents of which are incorporated herein by reference.

The present invention is highly convenient and effective by being applied to a digital camera such as a single-lens reflex camera or a mirrorless camera, an in-vehicle camera, a surveillance camera, or a smartphone.

EXPLANATION OF REFERENCES

100: digital camera
101: imaging optical system
20: imaging element
3: image shake correction device
104: AFE
105: imaging element drive unit
106: motion detection sensor
108: system controller
107: image processing unit
K: optical axis
1A: support member
1B: movement prevention member
1Ba: first portion
1Bb: second portion
Mh1: X-axis position detection magnet
Mh2: Y-axis rotation position detection magnet
Mh3: Y-axis rotation position detection magnet
1$s$, 2$s$, 3$s$: S-pole
1$n$, 2$n$, 3$n$: N-pole
My1: X-axis rotation drive magnet
Mv2: X-axis rotation drive magnet
Mv3: Y-axis drive magnet
mv1: X-axis rotation drive magnet
mv2: X-axis rotation drive magnet
mv3: Y-axis drive magnet
2: movable member
C1: X-axis rotation drive coil
C2: X-axis rotation drive coil
C3: Y-axis drive coil
21: circuit board
H1: X-axis position detection Hall element
H2: Y-axis rotation position detection Hall element
H3: Y-axis rotation position detection Hall element
24$a$, 24$b$, 24$c$: spring
20$a$: light receiving surface
20$b$: second side
20$c$: first side
P: center of light receiving surface
R: rotation axis
10: base
11$a$, 11$b$: hole portion
12, 14: yoke
13: coupling member
15$a$, 15$b$, 15$c$: flat surface
16$a$, 16$b$, 16$c$: hook
17$a$, 17$b$, 17$c$: projecting portion
18: yoke
19$a$: hole portion
19$b$, 19$c$: notch portion
21$a$, 21$b$, 21$c$: connector
22: base
23$a$, 23$b$, 23$c$: hook
25, 26, 27: flexible print substrate
25$a$, 26$a$: first portion
25$b$, 26$b$: folded portion
27$a$: fixed portion
27$b$: non-fixed portion
28A, 28A: attachment portion
28$a$, 28$b$: insertion member
280$a$, 280$b$: flat plate portion
281$a$, 281$b$: wide width portion
282$a$, 282$b$: shaft portion
283$a$, 283$b$: abutting portion
L1, D1, D2: straight line
29$a$, 29$b$, 29$c$: bottom surface
290$a$, 290$b$, 290$c$: recess portion
200: smartphone
201: casing
202: display panel
203: operation panel
204: display input unit
205: speaker
206: microphone
207: operation unit
208: camera unit
210: wireless communication unit
211: call handling unit
212: storage unit
213: external input and output unit 214: GPS reception unit
215: motion sensor unit
216: power supply unit
217: internal storage unit
218: external storage unit
220: main controller
ST1 to STn: GPS satellites

What is claimed is:

1. An image shake correction device comprising:
a movable member to which an imaging element is fixed;
a support member that supports the movable member to be movable in a plurality of directions including a first direction and a second direction orthogonal to each other along a light receiving surface of the imaging element, and is disposed opposite the light receiving surface with respect to the movable member; and
a movement restrictor that restricts movement of the movable member in the plurality of directions and a direction perpendicular to the light receiving surface,
wherein the movement restrictor includes
a movement prevention member that is fixed to the support member and prevents the movable member from moving in the direction perpendicular to the light receiving surface while sandwiching the movable member in cooperation with the support member,
a hole portion that is formed in one member of the movable member and the support member, and
an insertion member that is formed at other member of the movable member and the support member and is inserted into the hole portion,
the movement prevention member has a first portion that is adjacent to a first side of the light receiving surface and extends along the first side, and a second portion that is adjacent to a second side orthogonal to the first side of the light receiving surface and extends along the second side,
the hole portion is formed in a region opposite the first portion with respect to a straight line passing through a center of the light receiving surface and extending in a direction parallel to the first side and opposite the second portion with respect to a straight line passing through the center of the light receiving surface and extending in a direction parallel to the second side as viewed from the direction perpendicular to the light receiving surface,
the insertion member includes
an abutting portion that is positioned in the hole portion and enters a state in which the abutting portion abuts on an inner surface of the hole portion and a state in which the abutting portion does not abut on the inner surface by moving in the plurality of directions in the hole portion in accordance with the movement of the movable member, and
a wide width portion that is disposed outside the hole portion opposite a side of the other member on which the insertion member is formed, and
the wide width portion has a size such that the wide width portion overlaps the one member on which the hole portion is formed as viewed from the direction perpendicular to the light receiving surface even in a state in which the abutting portion is positioned at any position in the hole portion.

2. The image shake correction device according to claim 1,
wherein the hole portion is formed at an end portion opposite the second portion in the direction parallel to the first side in the region, and at the end portion opposite the first portion in the direction parallel to the second side in the region.

3. The image shake correction device according to claim 2,
wherein the wide width portion is larger than the hole portion as viewed from the direction perpendicular to the light receiving surface.

4. The image shake correction device according to claim 3, further comprising:
a first drive magnet of the movable member that is disposed at a portion of the support member facing the movement prevention member;
a second drive magnet of the movable member that is disposed at a portion of the movement prevention member facing the first drive magnet; and
a drive coil of the movable member that is disposed at a position of the movable member sandwiched between the first drive magnet and the second drive magnet,
wherein the movement prevention member is made of a material that prevents a magnetic flux leakage of the first drive magnet and the second drive magnet, and
a maximum distance between the one member in which the hole portion is formed and the wide width portion is equal to or less than a distance between the second drive magnet and the drive coil.

5. An imaging device comprising the image shake correction device according to claim 4.

6. An imaging device comprising the image shake correction device according to claim 3.

7. The image shake correction device according to claim 2, further comprising:
a first drive magnet of the movable member that is disposed at a portion of the support member facing the movement prevention member;
a second drive magnet of the movable member that is disposed at a portion of the movement prevention member facing the first drive magnet; and
a drive coil of the movable member that is disposed at a position of the movable member sandwiched between the first drive magnet and the second drive magnet,
wherein the movement prevention member is made of a material that prevents a magnetic flux leakage of the first drive magnet and the second drive magnet, and
a maximum distance between the one member in which the hole portion is formed and the wide width portion is equal to or less than a distance between the second drive magnet and the drive coil.

8. An imaging device comprising the image shake correction device according to claim 7.

9. An imaging device comprising the image shake correction device according to claim 2.

10. The image shake correction device according to claim 1,
wherein the wide width portion is larger than the hole portion as viewed from the direction perpendicular to the light receiving surface.

11. The image shake correction device according to claim 10, further comprising:
a first drive magnet of the movable member that is disposed at a portion of the support member facing the movement prevention member;
a second drive magnet of the movable member that is disposed at a portion of the movement prevention member facing the first drive magnet; and a drive coil of the movable member that is disposed at a position of the movable member sandwiched between the first drive magnet and the second drive magnet, wherein the movement prevention member is made of a material that prevents a magnetic flux leakage of the first drive magnet and the second drive magnet, and a maximum distance between the one member in which the hole portion is formed and the wide width portion is equal to or less than a distance between the second drive magnet and the drive coil.

12. An imaging device comprising the image shake correction device according to claim 11.

13. An imaging device comprising the image shake correction device according to claim 10.

14. The image shake correction device according to claim 1, further comprising:
- a first drive magnet of the movable member that is disposed at a portion of the support member facing the movement prevention member;
- a second drive magnet of the movable member that is disposed at a portion of the movement prevention member facing the first drive magnet; and
- a drive coil of the movable member that is disposed at a position of the movable member sandwiched between the first drive magnet and the second drive magnet, wherein the movement prevention member is made of a material that prevents a magnetic flux leakage of the first drive magnet and the second drive magnet, and a maximum distance between the one member in which the hole portion is formed and the wide width portion is equal to or less than a distance between the second drive magnet and the drive coil.

15. An imaging device comprising the image shake correction device according to claim 14.

16. An imaging device comprising the image shake correction device according to claim 1.

* * * * *